US009226378B2

(12) United States Patent
Hamatani et al.

(10) Patent No.: US 9,226,378 B2
(45) Date of Patent: Dec. 29, 2015

(54) PLASMA TORCH

(75) Inventors: Hideki Hamatani, Tokyo (JP); Sunao Takeuchi, Tokyo (JP); Fuminori Watanabe, Tokyo (JP); Tetsuro Nose, Tokyo (JP); Oleg Pavlovich Solonenko, Novosibirsk (RU); Andrey Vladimirovich Smirnov, Novosibirsk (RU)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 155 days.

(21) Appl. No.: 13/984,414

(22) PCT Filed: Feb. 25, 2011

(86) PCT No.: PCT/RU2011/000109

§ 371 (c)(1), (2), (4) Date: Aug. 8, 2013

(87) PCT Pub. No.: WO2012/115533

PCT Pub. Date: Aug. 30, 2012

(65) Prior Publication Data

US 2013/0319979 A1 Dec. 5, 2013

(51) Int. Cl.

*B23K 10/00* (2006.01)
*H05H 1/02* (2006.01)
*H05H 1/34* (2006.01)

(52) U.S. Cl.

CPC . *H05H 1/02* (2013.01); *H05H 1/34* (2013.01); *H05H 2001/3426* (2013.01); *H05H 2001/3452* (2013.01); *H05H 2001/3478* (2013.01); *H05H 2001/3484* (2013.01)

(58) Field of Classification Search

CPC ............ H05H 1/26; H05H 2001/3452; H05H 2001/3484
USPC .............. 219/121.5, 121.51, 75, 121.48, 119, 219/121.39, 121.59, 121.45
See application file for complete search history.

(56) References Cited

U.S. PATENT DOCUMENTS 4,317,984 A 3/1982 Fridlyand
2008/0121624 A1 5/2008 Belashchenko et al.

FOREIGN PATENT DOCUMENTS

EP 0810053 12/1997
JP 55-033791 3/1980

(Continued)

OTHER PUBLICATIONS

International Search Report dated Nov. 23, 2011, issued in corresponding PCT Application No. PCT/RU2011/000109.

(Continued)

*Primary Examiner* — Mark Paschall
(74) *Attorney, Agent, or Firm* — Kenyon & Kenyon LLP

(57) ABSTRACT

A plasma torch comprises a cascade between a cathode and an anode. The cascade is an inter-electrode insert. An interior of the cascade is shaped so that a diameter of the interior expands in series in a plurality of steps from a side of the cathode to a side of the anode. As a result of the cascade being provided, the output power of the plasma torch is obtained not by an increase in the electric current but by an increase in the arc electric voltage. Therefore, the lifespan of each of the electrodes, i.e., the cathode and the anode, becomes remarkably longer. In addition, since a quasi laminar flow of the plasma is generated in the interior of the cascade, a fluctuation in the output power of the plasma jet is reduced. Thus, it is possible to lower the driving and operating costs. Therefore, it is possible to perform surface treatment such as plasma spraying, utilizing a high-performance plasma processing, a processing of refractory powder materials, and plasma chemistry processing and the like, with a high degree of efficiency. In addition, a side shield module is provided at an outlet side of the anode of the forming nozzle. The side shield module generates a gas shield jet which is coaxial, annular, and low-velocity. Thus, gas from the surrounding environment is prevented from flowing in. Consequently, oxygen is prevented from entering the forming nozzle and the plasma jet. Hence, it is possible to generate a plasma jet having a low Reynolds number of the plasma forming gas, with a quasi laminar flow, exhibiting low noise, the diameter of its cross section expanding in a stable manner, having a long plasma length, and comprising argon, nitrogen, and hydrogen.

18 Claims, 7 Drawing Sheets

(56) References Cited

FOREIGN PATENT DOCUMENTS

| | | |
|---|---|---|
| JP | 2010-082697 | 4/2010 |
| RU | 68944 | 12/2007 |
| WO | 2004/028221 | 4/2004 |
| WO | 2006/012165 | 2/2006 |
| WO | 2009/018837 | 2/2009 |
| WO | 2009/018838 | 2/2009 |

OTHER PUBLICATIONS

Japanese Office Action dated Jun. 11, 2013, issued in Japanese Application No. JP2013-518308.

Office Action dated Dec. 8, 2014 issued in corresponding Russian Application No. 2013139165 [with English translation].

PLASMA TORCH

TECHNICAL FIELD

The present invention relates to a plasma torch comprising a cascade (an inter-electrode insert) used in surface treatment such as plasma spraying utilizing high-performance plasma processing, a processing of refractory powder materials, and plasma chemistry processing. This application is a national stage application of International Application No. PCT/RU2011/000109, filed Feb. 25, 2011.

BACKGROUND ART

In general, a non-transfer type electric-arc plasma torch, for example, is conventionally well known in the art as a plasma torch used when surface treatment such as plasma spraying and the like, and a welding of between steel plates are performed. In addition, in the areas of surface treatment such as plasma spraying and the like, a processing of refractory powder materials, and plasma chemistry processing, a plasma torch which supplies working gas in an intensive and swirling manner is presently most widely used. Further, such a plasma torch is configured so that the working gas is supplied to a relatively short electric discharge channel, and a turbulent plasma jet is generated, (for example, PlazJet: registered trademark/TAFA Corporation, 100HE Axial Feed Liquid Precursor Plasma Spray (registered trademark)/Progressive Surface Corporation, F4, F8, 9MB (registered trademark)/SULZER METCO Corporation, and the like)

In addition, a plasma torch is suggested such that the plasma torch comprises a cathode, an anode, and a cascade provided between the cathode and the anode, wherein each of the cathode, the anode, and the cascade is insulated from one another and is configured to be water-cooled individually (see, for example, Patent Document 1). According to the plasma torch disclosed in Patent Document 2, an anode gas and a cathode gas passing through the cathode are provided. Moreover, the plasma torch disclosed in Patent Document 2 is configured so that an electric voltage is applied between the cathode and the anode, and plasma is generated. According to the plasma torch disclosed in Patent Document 2, the cascade is provided. As a result, a distance between a cathode point on the cathode and an anode point on the anode becomes longer. Consequently, the electric voltage becomes higher, and a (pseudo) laminar plasma jet can be created more easily,

[Patent Document 1] Japanese Unexamined Patent Application, First Publication No. 2010-82697

DISCLOSURE OF INVENTION

Problems to be Solved by the Invention

However, the conventional plasma torch, configured as described above, has the following problems:

(1) A turbulent plasma jet flows out from a forming nozzle while forming a swirl. Since the turbulent plasma jet actively mixes with a surrounding, low-temperature atmosphere, the turbulent plasma jet rapidly loses its enthalpy. As a result, a length of a zone, over which a metal sheet and powder and the like may be heated effectively, cannot exceed five to seven times the measurement length of an inner diameter of the nozzle in the axial direction of the forming nozzle. This is insufficient for effectively processing a particle when a refractory powder material (such as oxides, carbides, nitrides, and the like) is being processed. This is because the period of time, during which a portion to be processed is exposed to a high-temperature jet core, is short. According to a series of technical process for performing a surface treatment, it is necessary that the plasma jet be low-velocity, low-noise, relatively long (i.e., greater than or equal to 150 mm), and have a large diameter.

(2) When a low-thermal-conductive particle (such as $Al_2O_3$, $ZrO_2$ and the like) remains at a region of a plasma jet such that the gas temperature satisfies T>Tmp (Tmp indicates the melting temperature of a material), and the time during which the low-thermal-conductive particle remains at the region is inadequate, a particle which is not fully melted may appear at the peripheral of the plasma jet. At the same time, such a particle (low-thermal conductive particle), which is not completely melted, may evaporate at a paraxial zone of the plasma jet. As a result, there is a problem in that the heat exchange between the plasma and the particle becomes less, and thus the efficiency of the power treatment declines.

(3) When a temperature gradient and/or a velocity in the radial direction of the flow of the turbulent gas are too large, there is a high possibility that a particle, which has not melted at all, or a particle, which has only been partially melted, may appear.

(4) When a frequency of a spectrum of a turbulent pulsation of approximately 1-5 kHz, caused by a large-scale arc shunting, is added to the inner velocity temperature gradient of the plasma jet, a significant amount of discrepancy is generated with respect to the velocity of the particle and the temperature of the local part and the cross-section of the plasma jet. As a result, the characteristics of the final product lack uniformity.

(5) According to the conventional plasma torch, the attachment of the arc to the surface of the anode is restricted. Consequently, the temperature and the velocity field of the plasma jet, which is flowing out, become non-axisymmetric. As a solution to such a problem, the magnitude of the swirling force of the working gas is usually increased. As a result, the arc spot rotates at the surface of the anode. However, when the flow velocity of the working gas is small, i.e, when the Reynolds number is small, a swirling effect due to the pressure of the gas cannot be obtained. Therefore, the above solution of increasing the magnitude of the swirling force of the working gas cannot be applied effectively. Another solution is to install a solenoid covering the anode, thus applying an electromagnetic swirling. However, when this solution is applied, the structure of the plasma torch becomes intrinsically complicated, while the problems described above are not solved adequately.

(6) When the plasma jet has an element of a rotational velocity, a significant amount of particles move towards the outer peripheral part of the plasma jet. Therefore, the efficiency with which the particle is heated becomes lower. Furthermore, since a swirling plasma jet is usually turbulent, the length of the plasma jet is relatively short.

(7) Due to the turbulent plasma flow, the noise level becomes extremely large. The noise level might be as large as 120-130 dB.

The present invention aims to solve each of the problems described above. In other words, the present invention aims to provide a plasma torch comprising a cascade (an inter-electrode insert insulated electrically) between the cathode and an anode. The plasma torch can perform surface treatment such as plasma spraying, utilizing a high-performance plasma processing, a processing of refractory powder materials, and plasma chemistry processing and the like, with a high degree of efficiency.

Means for Solving the Problems

The inventors of the present invention have diligently analyzed how to solve the problems discussed above. First, as one of the solutions to the above problems, the inventors have come up with a method which generates a long plasma jet which is a quasi-laminar flow (with small flow velocity) having a high enthalpy. The method also generates a long plasma jet. Since a gas of the jet moves in a swirling manner, the amount of flow is restrained to be as small as possible. The amount of flow in this case is presumed to be sufficient so that the arc can attach to the anode in a stable manner. Here, as a result of viscous dissipation, the rotational element of the gas velocity is restricted in the discharge route. Moreover, at the forming outlet of the plasma torch, the amount of cold gas mixing from the surrounding atmosphere is greatly reduced.

At the same time, the plasma torch comprises a cascade (inter-electrode insert). As a result, almost all of the problems described above can be solved. In this case, the length of the electric arc is significantly longer than a "self-stabilizing-type" plasma torch. Assuming that all other conditions are equal, the output power of the plasma jet increases, not due to an increase in the electric current, but due to an increase in the arc electric voltage. In addition, since the plasma torch is configured so that a high-electric-conducting gas is separately supplied to a space between the cascade and the anode, it is possible to prevent the attachment of the arc to the surface of the anode from being restrained. In this case, since the degree with which the are attaches to the surface is evenly distributed, the plasma jet becomes axisymmetric at the eforming outlet of the election nozzle.

As a significant technical aspect of material processing, it is desirable that the plasma jet be sufficiently long, and that the diameter of the cross-section of the plasma jet be large. Usually, the diameter of the ejected plasma jet is determined by the electric are route as well as the inner diameter of the forming nozzle. When the amount of flow of the plasma working gas is small, it is problematic to increase the diameter of the plasma jet. This is because, increasing the diameter of the plasma jet is contrary to various aspects such as stabilizing the plasma jet over a wide range, maintaining a uniform temperature of the plasma working gas, and maintaining a uniform velocity distribution of the cross section of the plasma working gas. Therefore, as far as the inventors of the present invention know, an improvement on an electric-arc plasma torch has never been evaluated in order to solve the problems described above.

According to well known plasma torches installed on all of the commercially available welding devices, the plasma arc length, is of a "self-stabilizing type." The plasma arc length is fixed by a step in the direction to which diameter reduces from the cathode toward the anode. Compared with conventional plasma torches as described above, a plasma torch according to the present invention has, for example, the following advantages:

(1) A cascade (an inter-electrode insert) is provided between a cathode and an anode. As a result, the output power of the plasma torch is provided not by an increase in the electric current but by an increase in the arc electric voltage. As a result, the lifespan of each of the electrodes, i.e., the cathode and the anode, becomes remarkably longer.

(2) Since a cascade is provided, the degree of large-scale pulsations of the plasma arc length can be reduced significantly. Consequently, the fluctuation of the output power of the ejected plasma jet can be reduced by one digit and greater.

(3) The plasma arc attaches to the surface of the anode as lithe plasma arc is distributed. Consequently, the temperature of the plasma jet and the velocity field becomes axisymmetric. Moreover, the degree of the pulsation of the arc electric voltage and the output power can be reduced.

(4) In order to respond to a request for a specialized processing, air is used as a plasma forming gas. As a result, the cost required to perform a procedure using plasma technology can be reduced significantly. Moreover, the payback period of an equipment may also be shortened significantly.

(5) A quasi-laminar plasma jet can be used as a concentrated heat source. In this case, the efficiency of heating the surface can clearly exceed 90%. Further, when a ceramic powder is sprayed with a low thermal conductivity, the efficiency of the thermal spraying can be enhanced as well.

The present invention is made according to the above considerations. The present invention employs the configuration(s) described below.

Namely, a plasma torch according to the present invention is a plasma torch of a cascade-type comprising a cascade between a cathode and an anode. The plasma torch generates a plasma jet by applying an electric voltage between the cathode and the anode. Here, the cathode comprises a copper main body part comprising a water cooling structure, and a rod-shaped tungsten negative electrode inserted in the copper main body part. A pilot member is further provided between the cathode and the cascade. The pilot member is electrically insulated from the cathode and the anode. The pilot member also comprises a water cooling structure. The cascade is provided between the pilot member and the anode. The cascade comprises either a single component having an interior shaped so as to expand in multiple steps towards a side of the anode, or a plurality of components being electrically insulated from each other. The cascade is electrically insulated from the cathode and the anode. The cascade is configured as an inter-electrode insert comprising a water cooling structure. The anode is a copper component comprising a water cooling structure. The plasma torch further comprises a forming nozzle being connected so as to be electrically insulated from the anode. An interior of the forming nozzle is shaped so as to expand in multiple steps towards the anode. The forming nozzle also comprises a water cooling structure. The plasma torch further comprises a side shield module preventing a gas inflow from a surrounding environment by generating a coaxial, annular, and low-velocity gas shield jet, thereby preventing oxygen from entering the forming nozzle and a plasma jet ejected from the forming nozzle.

In addition, the above plasma torch may be configured as follows: a diameter $D_{cathode}$ of a tip of the negative electrode provided on the cathode satisfy an equation (1) $\{D_{cathode}=2+[(I-100)/100](mm)\}$. In the equation (1), [x] is an integer portion of x, an inside of a parenthesis. I is an arc electric current (A) in a range of $100 \le I \le 400$ (A).

In addition, the above plasma torch may be configured as follows: a diameter $D_{pilot}$ of a central opening part of the pilot member, and a diameter $D_{cathode}$ of a tip of the negative electrode provided on the cathode, satisfy an equation $\{D_{pilot}>D_{cathode}\}$.

In addition, the above plasma torch may be configured as follows: a bypass hole is provided at a surrounding of the central opening part provided on the pilot member. The working gas for generating a plasma flows from a side of the cathode towards a side of the cascade by passing through at least one of the central opening part or the bypass holes.

In addition, the above plasma torch may be configured as follows: a width $h=\{(D_{pilot}-D_{cathode})/2\}$ of a gap between the pilot member and the negative electrode provided on the cathode satisfies an equation (2) $\{2G_w/[\rho_w(D_{pilot}-D_{cathode})u_{w,\ sound}]<h\}$ and an equation (3) $\{h<2G_w/\pi\mu_w Re_{crit}-D_{cathode}/2\}$. Here, a minimum value of the width h of the gap is a value such that a mean mass velocity of the plasma working gas existing in a round gap between the negative electrode and the pilot member is smaller than a sound velocity of a plasma forming gas at an initial temperature. In addition, a maximum value of the width h of the gap is a value such that, at a predetermined mass flow rate Gw of the plasma working gas, a Reynolds number $Re=\{4Gw/\pi D_{pilot}\mu_w\}$ corresponding to a condition of a plasma working gas at an entrance of the pilot member is smaller than a critical Reynolds number $Re_{crit}=2100$. The critical Reynolds number is a value such that a gas flow inside a tube becomes a turbulent condition.

In addition, the above plasma torch may be configured as follows: the cascade comprises a plurality of components. An O-ring and an insulating ceramic ring are provided between each of the plurality of component and between the cascade and the cathode and the anode. A space between each of the plurality of components, and a space between the cascade and the cathode and the anode are connected while being electrically insulated.

In addition, the above plasma torch may be configured as follows: a diameter of the cascade increases in series in one or more steps from a side of the pilot member towards a side of the anode. A length $L_i$ (mm) of each step in a direction in which a plasma jet is ejected satisfies an equation $\{5 \le L_i (mm) \le 15\}$.

In addition, the above plasma torch may be configured as follows: a diameter of the cascade increases in series in one or more steps towards a side of the anode. When a length of an i-th position of the cascade from a side of the pilot member in a direction in which a plasma jet is ejected is represented as a $L_i$ (mm), and a dimension of a step in a radial direction is represented as a $\Delta r_i$ (mm), the $L_i$ (mm) and the $\Delta r_i$ (mm) in each of the steps satisfy an equation $\{4.5 \le L_i/\Delta r_i \le 15\}$.

In addition, the above plasma torch may be configured as follows: an inter-electrode length (between a tip of the cathode and an entrance of the anode) L between the tip of the negative electrode provided on the cathode and a tip of a side of the cascade of the anode satisfies an equation $\{50 \le L (mm) \le 150\}$.

In addition, the above plasma torch may be configured as follows: the anode comprises a flow path comprising a plasma inflow path, a cylindrical flow path, and a smooth inner wall. The plasma inflow path is connected to an outlet side of the cascade and comprises a tapered portion shaped so as to taper from an entrance side to the outlet side. The cylindrical flow path is connected to the plasma inflow path, and stabilizes the plasma by being provided with a same diameter towards the outlet side. In addition, an inner diameter $D_{anode}$ of the cylindrical flow path of the anode and a diameter $D_{pilot}$ of a central opening part of the pilot member satisfy an equation $\{1.5 \le D_{anode}/D_{pilot} \le 2.8\}$.

In addition, the above plasma torch may be configured as follows: a total gas mass flow rate $G_{total}$ satisfies an equation (4) $\{100 \le Re_{total} \le 500\}$ and an equation (5) $(0.15\ G_{total} \le G_{anode} \le 0.3\ G_{total})$. Here, a $Re_{total}(=4G_{total}/\pi D_{anode}\mu)$ in the equation (4) and the equation (5) indicates a Reynolds number computed at a cross section of an outlet side of the anode. A $T_{total}$ in a generalized equation (6)

$$\left\{G_{total} = \sum_j G_j\right\}$$

indicates the total gas mass flow rate (gram/second) of a j-th element of a gas compound comprised in a plasma and an anode shielding gas $G_j$.

In addition, the above plasma torch may be configured as follows: a gas compound comprised in the plasma is such that a maximum value of a mass ratio of each of argon, nitrogen, and hydrogen satisfy a first equation $\{G_{Argon}/G_{Nitrogen}=0.4\}$ and a second equation $\{G_{hydrogen}/G_{Nitrogen}=0.04\}$.

In addition, the above plasma torch may be configured as follows: the forming nozzle comprising a water cooling structure comprises an interior shaped so that a diameter of the interior increases in series from a side of the anode towards a forming outlet, the forming nozzle being connected while being electrically insulated from the anode.

In addition, the above plasma torch may be configured as follows: a ratio between an inner diameter $D_{exit}$ at an outlet of the forming nozzle and an inner diameter $D_{anode}$ of the cylindrical flow path of the anode satisfies an equation $\{1.5 \le D_{exit}/D_{anode} \le 2.5\}$.

In addition, the above plasma torch may be configured as follows: a diameter of the forming nozzle increases in series over one or more steps towards the forming outlet. When a length of an i-th position of the forming nozzle from a side of the anode in a direction in which a plasma jet is ejected is represented as a $L_{Ni}$ (mm), and a dimension of a step in a radial direction is represented as a $\Delta r_i$ (mm), the $L_{Ni}$ (mm) and the $\Delta r_i$ (mm) satisfy an equation $\{5 \le L_{Ni}/\Delta r_i \le 10\}$. Here, an inequality $\{1 \le i \le M-1\}$ is satisfied, the M being a number of steps.

In addition, the above plasma torch may be configured as follows: the side shield module uses the gas, at least one of an argon gas and a nitrogen gas, or a gas mixture thereof ejected from plurality holes which are formed to the annular in surroundings of the plasma jet and are arranged in coaxial and axisymmetric, as the gas shield jet.

In addition, the above plasma torch may be configured as follows: an interior of the cascade is shaped so that a diameter of the interior increases in series by a plurality of steps towards a side of the anode. Here, a number of the steps is in a range of four to ten.

In addition, the above plasma torch may be configured as follows: an outer diameter of a portion of the cathode, the cascade, the anode, and the forming nozzle having a largest diameter is less than or equal to 70 mm. In addition, a maximum length combining a length of the cathode, a length of the cascade, a length of the anode, and a length of the forming nozzle is less than or equal to 300.

Effects of the Invention

According to a plasma torch based on the present invention, a cascade is provided between a cathode and an anode. The cascade is an inter-electrode insert. In addition, the cascade is structured so that the diameter of the interior of the cascade increases in series from the cathode-side of the cascade to the anode-side of the cascade. According to the present invention, the cascade is provided having the above-described structure. As a result, the output power of the plasma torch can be obtained by an increase in the arc electric voltage without relying on an increase in the electric current. Therefore, it is possible to increase the lifespan of each of the electrodes, i.e., the cathode and the anode. In addition, since the interior of the cascade is shaped so that the diameter of the cascade increases in series, a quasi-laminar flow of the plasma is created in the interior of the cascade. Hence, the fluctuation of the output power of the plasma jet can be reduced. Moreover, the cost of operation and processing can be lowered. Consequently, it is possible to obtain a plasma torch which can perform surface treatment, utilizing a high-performance plasma, with a high degree of efficiency.

BRIEF DESCRIPTION OF THE DRAWINGS

FIG. 2A shows a condition in which a plasma working gas flows in from a central opening part of a pilot member towards a cascade side.

FIG. 2B shows a condition in which a plasma working gas flows in from a bypass hole and a central opening part of a pilot member towards a cascade side.

FIG. 2C shows a condition in which a plasma working gas flows in towards a cascade side when an angle shown in FIG. 2B of a bypass hole from an axial direction of a plasma torch is $\alpha/2$ degrees.

FIG. 3 shows a cascade comprising a plurality of components electrically insulated from one another.

FIG. 4 shows an anode, which is a positive electrode, and a forming nozzle, which is provided so as to be electrically insulated with respect to the anode.

FIG. 5A shows an example of a forming nozzle which is provided so as to be electrically insulated from an anode. The forming nozzle shown in FIG. 5A comprises an interior shaped so that a diameter of the interior increases in series by a plurality of backward-facing steps. As a result, a diameter of a cross section of an ejected plasma jet is augmented.

FIG. 5B shows an example of a forming nozzle which is provided so as to be electrically insulated from an anode. The forming nozzle shown in FIG. 5B comprises an interior shaped so that a diameter of the interior increases in series by a plurality of backward-facing steps. As a result, a diameter of a cross section of an ejected plasma jet is augmented.

FIG. 5C shows an example of a forming nozzle which is provided so as to be electrically insulated from an anode. The forming nozzle shown in FIG. 5C comprises an interior shaped so that a diameter of the interior increases in series by a plurality of backward-facing steps. As a result, a diameter of a cross section of an ejected plasma jet is augmented.

FIG. 6A shows a streamline of a gas shield jet (side shield gas) in an area near a forming nozzle, including an inner streamline and an exterior streamline. The streamline shown in FIG. 6A starts from an annular slit in a radial direction of a plasma torch.

FIG. 6B shows a low-velocity vector field of a side shield gas flow ejected from an annular slit.

DESCRIPTION OF REFERENCE NUMERALS

Figure 1:
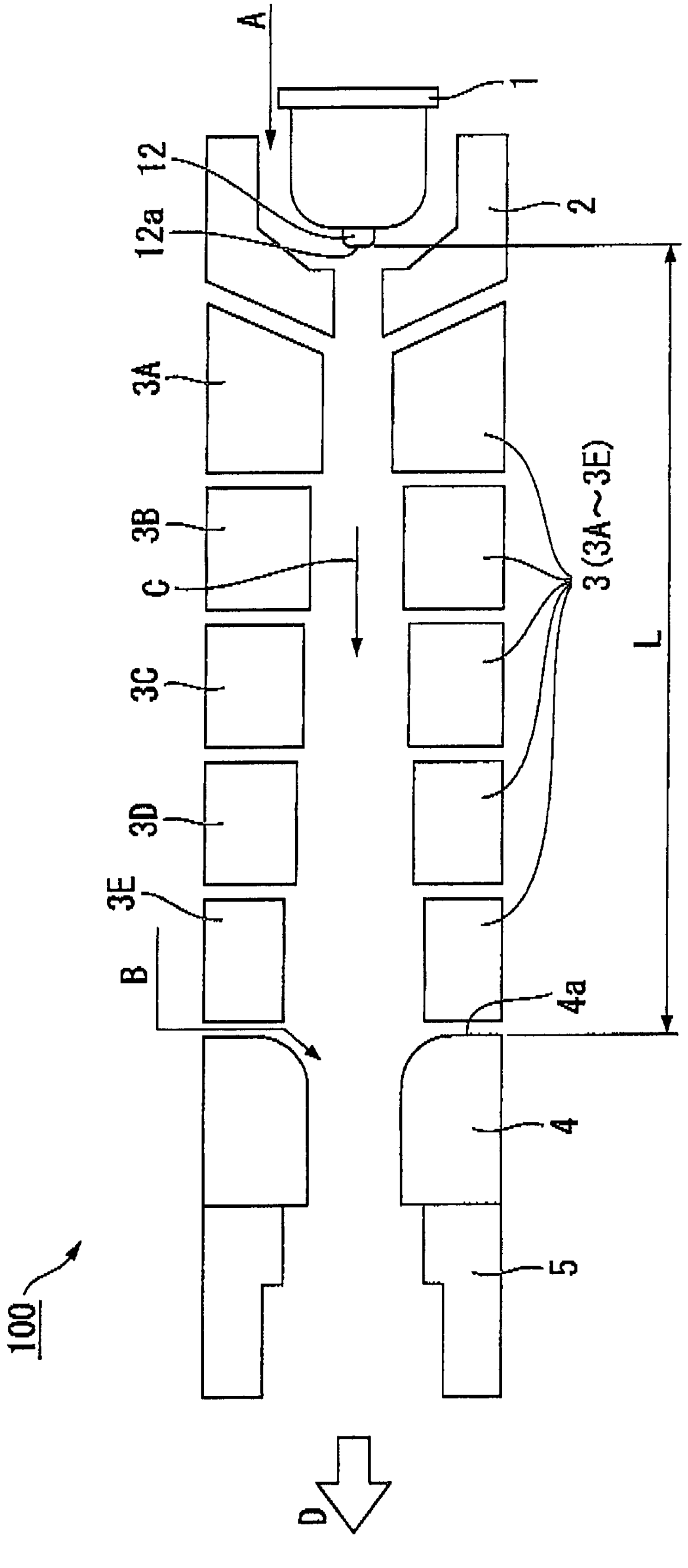
FIG. 1 is a cross sectional diagram illustrating a structure of a plasma torch according to an embodiment of the present invention.

100 - - - plasma torch
1 - - - cathode (aggregation of negative electrodes)
  11 - - - main body
  12 - - - negative electrode
  12*a* - - - tip
  13 - - - channel structure including water cooling structure
2, 2A, 2B - - - pilot member
  22 - - - central opening part
  24, 24*a*, 24*b* - - - bypass hole
3 - - - cascade (inter-electrode insert electrically insulated from one another)
  3A, 3B, 3C, 3D, 3E - - - component (cascade)
  3*a* - - - inlet
  3*b* - - - outlet
  31 - - - outer side insulating body
  32 - - - inner side insulating body
  33 - - - water cooling structure
  34 - - - O-ring
  35 - - - insulated ceramic ring
4 - - - anode
  4*a* - - - end part (inlet)
  4*b* - - - outlet
  4A - - - flow path
    41 - - - plasma inflow path
      41*a* - - - tapered part
    42 - - - circular flow path
    43 - - - anode chassis
      43*a* - - - gas inlet
    44 - - - swirling ring
    45 - - - copper positive electrode
    46 - - - insulating ring
5 - - - forming nozzle (forming nozzle comprising an electrically insulated interior shaped so that a diameter of the interior increases in series)
  5*a* - - - end part
  51 - - - forming outlet
  52 - - - step
  53 - - - forming end surface
6 - - side shield module
  62 - - - gas slit (annular gas slit)
A - - - cathode gas (plasma working gas)
B - - - anode gas (plasma working gas)
C - - - plasma forming gas
D - - - plasma jet
E - - - side shield jet (side shield gas)

BEST MODE FOR CARRYING OUT THE INVENTION

Hereinafter, an embodiment of a plasma torch according to the present invention is described with reference to FIGS. 1 to 6. The following embodiment is described in detail in order to facilitate an understanding of a gist of the present invention. Therefore, the following description does not limit the present invention in any way unless otherwise noted.

As illustrated in FIG. 1, a plasma torch 100 according to the present embodiment is a plasma torch of a cascade form. The plasma torch 100 is configured so that a cascade 3 is provided as an inter-electrode insert between a cathode 1 and an anode

4. According to the plasma torch 100, a plasma jet is formed by applying an electric voltage between the cathode 1 and the anode 4.

Figure 2A:
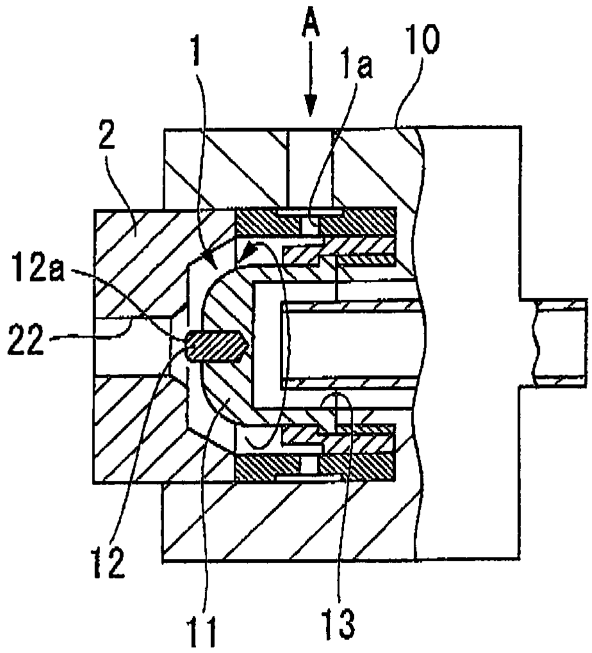
FIG. 2A is a cross sectional diagram illustrating a structure of a plasma torch according to an embodiment of the present invention.
Figure 2B:
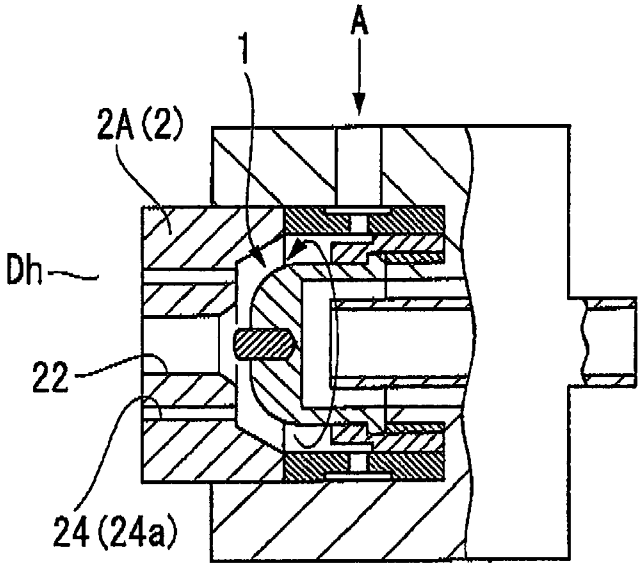
FIG. 2B is a cross sectional diagram illustrating a structure of a plasma torch according to an embodiment of the present invention.
Figure 2C:
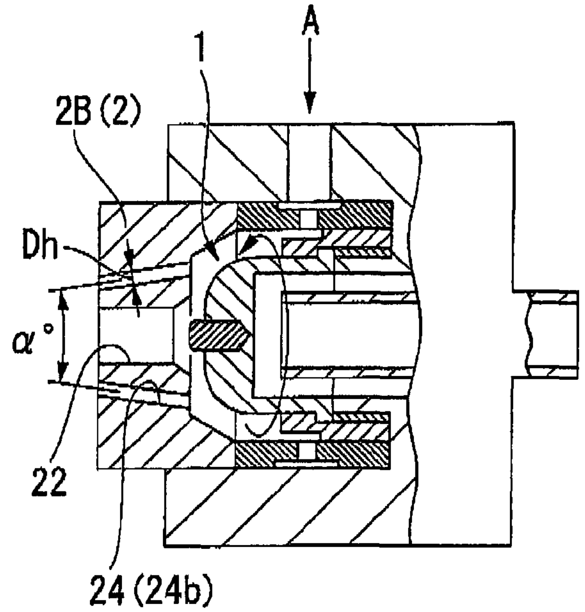
FIG. 2C is a cross sectional diagram illustrating a structure of a plasma torch according to an embodiment of the present invention.
Figure 3:
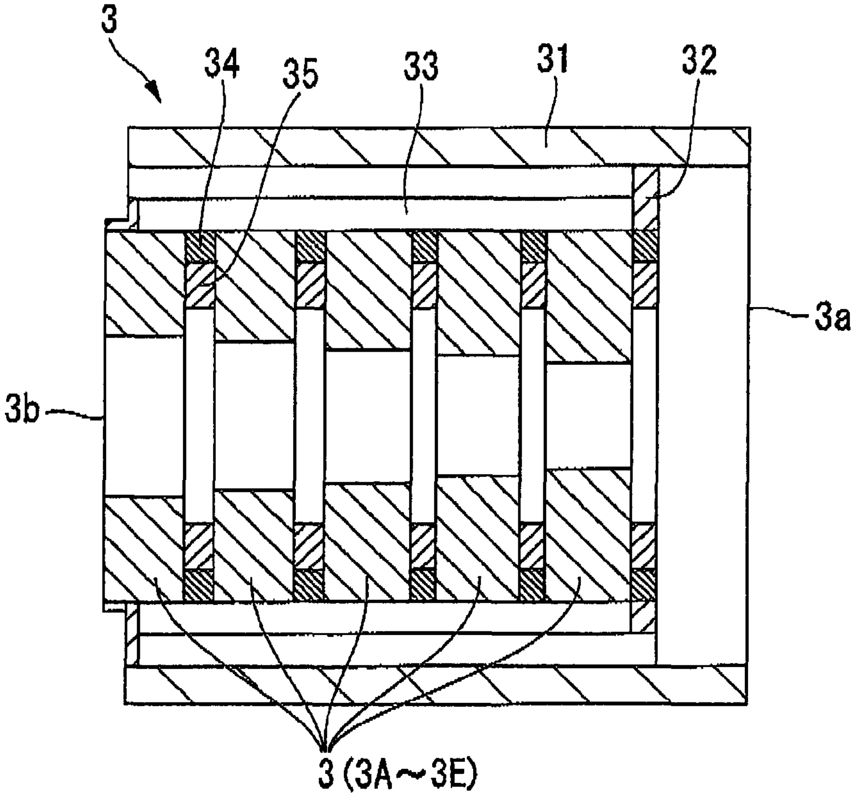
FIG. 3 is a cross sectional diagram illustrating a structure of a plasma torch according to an embodiment of the present invention.

As shown in FIGS. 2A, 2B, and 2C, the cathode 1 comprises a copper main body part 11 and a negative electrode 12. The main body part 11 comprises a channel structure including water cooling structure (a water cooling structure) 13. The negative electrode 12 is rod-shaped, includes tungsten, and is inserted into the main body part 11. Further, the cathode 1 illustrated in FIGS. 2A, 2B, and 2C comprises a gas inlet 1*a* through which a cathode gas (plasma working gas) A is injected. The cathode 1 is configured so that the main body part 11 is fitted and supported by the torch holder 10.

In addition, as shown in FIG. 1, a pilot member 2 is provided between the cathode 1 and the cascade 3. The pilot member 2 is electrically insulated from the cathode 1 and the anode 4. The pilot member 2 also comprises a water cooling structure, which is not diagrammed. According to an example shown in FIGS. 2A, 2B, and 2C, the pilot member 2 is fitted and supported by the torch holder 10, as in the case of the cathode 1.

The cascade 3 is placed between the pilot member 2 and the anode 4. The cascade 3 comprises either a single component comprising an interior shaped so as to expand in series over multiple steps towards the side of the anode 4, or a plurality of components being electrically insulated from one another. According to an example shown in FIG. 1, the cascade 3 comprises five components 3A to 3E. The cascade 3 is electrically insulated from the cathode 1, pilot member 2 and the anode 4. In addition, the cascade 3 is configured as an inter-electrode insert comprising a channel structure including water cooling structure 33. Furthermore, according to the cascade 3 illustrated in FIG. 3, the torso circumference is configured cylindrically, comprising an outer side insulating body 31 and an inner side insulating body 32. A space provided between the outer side insulating body 31 and the components 3A to 3E is configured as a channel structure including water cooling structure 33, cooled by running water. Furthermore, an O-ring 34 and an insulated ceramic ring 35 are provided between each of the components 3A to 3E. The O-ring 34 is provided in the outer side while the ceramic ring 35 is provided in the inner side. The O-ring 34 and the ceramic ring 35 are connected so that each of the components 3A to 3E is insulated.

The cascade 3 is configured so that a cathode gas (plasma working gas) A flows in from the side of the inlet 3*a*, mixes with an anode gas (plasma working gas) B in the interior, generates a plasma as a plasma forming gas C, and may be ejected from the side of the outlet 3*b*.

Further, according to the present embodiment, a configuration is possible in which the O-ring 34 and the insulated ceramic ring 35 are provided between the cascade 3, the cathode 1 (pilot member 2), and the anode 4 as well. According to the example shown in FIG. 3, an O-ring 34 and an insulated ceramic ring 35 are provided at the side of the cathode 1A (the side of the pilot member 2) of the component 3A.

As described above, the cascade 3 according to the present embodiment is configured as an inter-electrode insert comprising a plurality of components 3A-3E which are electrically insulated from one another. At the same time, the cascade 3 is configured to be electrically insulated between the cathode 1 (pilot member 2) and the anode 4. When the operating voltage applied to the plasma torch is increased, for example, the number of components of the cascade 3 configured as described above may be increased. Thus, the cascade 3 may be driven with a higher electric voltage by increasing the number of steps in the configuration.

The anode 4 is a copper member comprising a channel structure including water cooling structure 43. In addition, the plasma torch 100 according to the present invention comprises a forming nozzle 5. The forming nozzle 5 is connected to the anode 4 while being electrically insulated from the anode 4. The shape of the interior of the forming nozzle 5 expands in multiple steps towards the opposite side of the anode 4. Further, the forming nozzle 5 comprises a water cooling structure, not diagrammed.

The anode 4 is connected as shown in FIG. 1 so that the end part 4*a* is electrically insulated with respect to the outlet 3*b* of the cascade 3. Furthermore, the anode 4 shown in the diagram comprises a flow path 4A comprising a plasma inflow path 41 and a circular flow path 42. The plasma inflow path 41 comprises a tapered part 41*a* which converges smoothly towards the side of the outlet 4*b*. The circular flow path 42 stabilizes the plasma by being connected to the plasma inflow path 41, and by having a same diameter towards the side of the outlet 4*b*. In addition, a swirling ring 44 is provided in the plasma inflow path 41 at a position connecting with the outlet 3*b* of the cascade 3. Further, an insulating ring 46 is provided at an outlet 4*b* connecting with the forming nozzle 5. An anode 4 comprises an inlet 43*a* through which an anode gas B is supplied. This inlet 43*a* is connected to the plasma inflow path 41.

Figure 4:
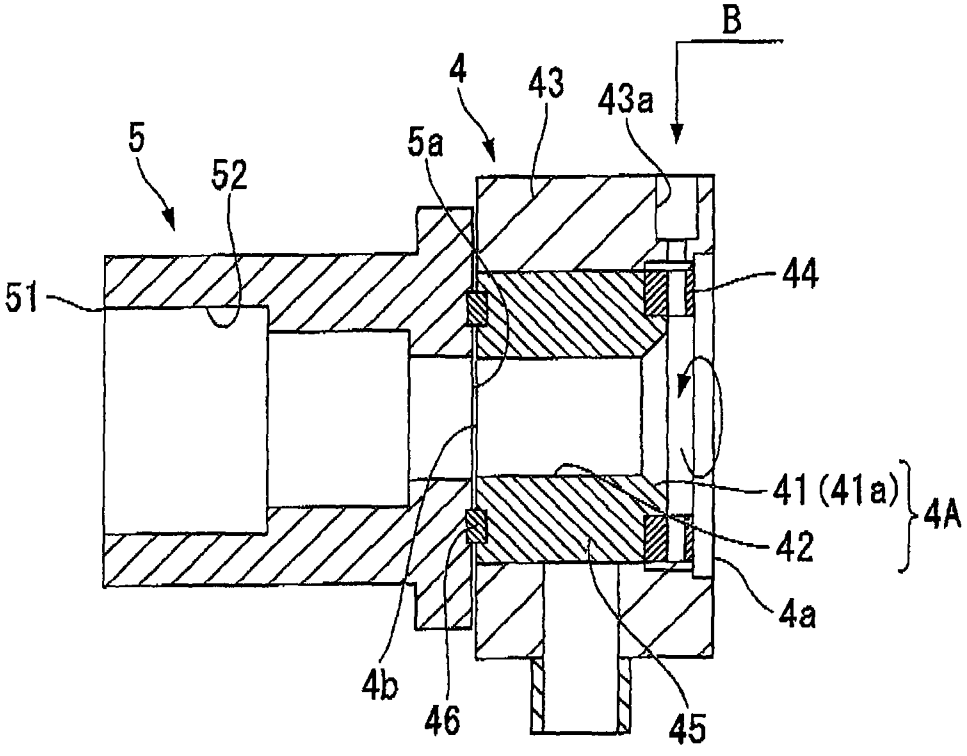
FIG. 4 is a cross sectional diagram illustrating a structure of a plasma torch according to an embodiment of the present invention.

As illustrated in FIG. 4, the end part 5*a* of the forming nozzle 5 connected to the outlet 4*b* side of the anode 4 via the insulating ring 46 so that the forming nozzle 5 is electrically insulated from the anode 4. The forming nozzle 5 comprises an interior shaped so as to expand in multiple series through a step 52. Thus, the forming nozzle 5 is configured so that a plasma jet D can be formed in a stable manner while being ejected from the forming outlet 51. According to the example shown in FIG. 4, the forming nozzle 5 comprises a backward-facing step comprising two steps 52.

The plasma torch 100 comprises a side shield module 6 (see FIGS. 6A, 6B) which generates a gas shield jet (side shield gas) E which is coaxial, annular, and low-velocity. Thus, gas from the surrounding environment is prevented from flowing in. Consequently, oxygen is also prevented from mixing into the initial zone of plasma jet flowing out from the forming nozzle 5. The side shield module 6 illustrated in FIGS. 6A and 6B comprises an exhaust nozzle, not diagrammed, and an annular gas slit 62 formed on an forming end surface 53 of the forming nozzle 5. The side shield module 6 is configured so that a gas shield jet E supplied from an exhaust nozzle, not diagrammed, flows into the gas slit 62 while diffusing over the forming end surface 53 of the forming nozzle 5. Furthermore, the side shield module 6 is configured so that a portion of a gas shield jet E spreads over the forming end surface 53 of the forming nozzle 5, flows in through the forming outlet 51 into the interior shaped with multiple steps, and spreads up to a position of a step 52 near the inlet, as described in further detail later on.

As described above, the plasma torch 100 according to the present embodiment comprises a cathode 1, a cascade 3, and an anode 4. In addition, a pilot member 2 is provided between a cathode 1 and a cascade 3. Further, a forming nozzle 5 is provided at an outlet side of the anode 4. Further, the space between each of these components is electrically insulated, and each of the components is water-cooled individually.

The interior of the cascade 3 of the plasma torch 100 according to the present invention is shaped so that the diameter of the interior increases in series from the cathode 1 side to the anode 4 side. A cathode gas (plasma working gas) A and an anode gas (plasma working gas) B are supplied through a cascade 3 provided between the cathode 1 and the anode 4. Plasma is generated by applying an electric voltage between the cathode 1 and the anode 4.

The cascade 3 provided in the plasma torch 100 according to the present invention is configured differently from conventional plasma torches. According to the present invention, a cascade 3 is provided. As a result, the distance between a negative electrode point on the cathode 1 and a positive electrode point on the anode 4 becomes long. As a result, the electric voltage becomes higher. Moreover, a quasi-laminar plasma jet can be formed more easily.

According to the plasma torch 100 based on the present invention, it is preferable that the diameter $D_{cathode}$ of the tip 12*a* of the negative electrode 12 provided in the cathode 1 satisfy the following equation (1).

$$D_{cathode}=2+[(I-100)/100]\ (\mathrm{mm}) \quad (1)$$

Here, in equation (1) above, [x] indicates an integer part of x (inside the parenthesis). Further, I represents an arc electric current (A), and is in the range of $100 \le I \le 400$ (A).

The diameter $D_{cathode}$ of the tip 12*a* of the negative electrode 12 satisfies the above equation (1). As a result, it is possible to obtain a stabilized electric discharge. Hence, a further stabilized plasma can be generated.

Furthermore, according to the plasma torch 100 based on the present invention, regardless of whether or not a second configuration (refer to the pilot member 2 described in detail later on) is applied in order to redistribute (bypass) the mass flow rate $G_w$ of the cathode gas (plasma working gas) A into two flows, for example, it is preferable that the diameter $D_{pilot}$ of the central opening part 22 of the pilot member and the diameter $D_{cathode}$ of the tip 12*a* of the negative electrode 12 provided in the cathode 1 satisfy the following inequality: $\{D_{pilot}>D_{cathode}\}$ When the above inequality is satisfied, the cathode gas A flows in a stable manner towards the side of the pilot 2 (the side of the cascade 3). In addition, a more stable electric discharge can be obtained. Hence, it is possible to form a more stable plasma.

In addition, the plasma torch 100 according to the present invention may be configured so that a bypass hole 24 (24*a*, 24*b*) is provided around the central opening part 22 provided in the pilot member 2, as illustrated in FIGS. 2B and 2C. According to this configuration, a cathode gas (plasma working gas) A, utilized to generate plasma, flows towards the side of the cascade 3 from the side of the cathode 1, by passing through at least either of the central opening part 22 or the bypass hole 24. Incidentally, according to the example shown in FIG. 2B, the bypass hole 24*a* is provided approximately parallel to the central opening part 22. In the example shown in FIG. 2C, the bypass hole 24*b* is provided at a predetermined angle with respect to the central opening part 22.

According to the present invention, it is possible to divide the flow rate of the cathode gas A into two parts by employing a pilot member 2A and 2B comprising a bypass hole 24*a*, 24*b*, as an alternative to the pilot member 2. The bypass hole 24*a*, 24*b* used in this case is configured, as described above, either as a gas supplying path parallel to a central opening part 22, which is a path of an electric arc (see reference numeral 24*a* in FIG. 2B); or, as a gas supplying path having a predetermined angle ($\alpha/2°$) (see reference numeral 24*b* in FIG. 2C). According to such a configuration, the flow rate of the cathode gas A is redistributed into two flows. One of the flows (referred to here as a "first flow" for clarity) has a mass flow rate of $G_w$, and is led to the axis r=0. Thereafter, the first flow drains out toward the cascade 3 side by passing through the central opening part 22 of the pilot member 2. Here, the diameter of the central opening part 22 is $D_{pilot}$. Next, the other flow (referred to here as a "second flow" for clarity) has a mass flow rate of $G_{w1}$. The second flow passes through a plurality of bypass holes 24 (24*a*, 24*b*) each of which are round and have a diameter of $D_{bh}$. The second flow then drains out from a gap between the pilot member 2 and the cascade 3. In this case, the mass ratio $G_{w1}/G_w$ is defined approximately as in the general equation (7) below.

$$G_{w1}/G_w \cong \min(S_{bh},S_g)/[\min(S_{bh},S_g\}+S_0] \quad (7)$$

Here, in the general equation (7) above, each of the variable represents the following.

$S_{bh}=\pi D_h^2 n$: the total area of a plurality of bypass holes $D_h$: diameter of the bypass hole n: number of holes that were used $S_g=\pi D_{IBI,\ 1} h_g$: area of the outlet of the gap $D_{IBI,\ 1}$: inner diameter of the rust portion of the cascade $h_g$: width of the gap $S_0=\pi D_{pilot}^2/4$: area of the central opening part of the pilot member As in the configuration described above, when the cathode gas A is redistributed by using each opening part provided on the pilot member 2, a small scale turbulence is generated at an initial zone of the electric arc. As a result, the arc electric voltage increases, and the plasma flow output power increases.

The inner diameter $D_{pilot}$ of the pilot member 2 can be determined based on the considerations described below.

First, it is impossible to configure the inner diameter $D_{pilot}$ to be smaller than the diameter $D_{cathode}$ of the rod-shaped negative electrode 12. In other words, the inequality $\{D_{pilot}>D_{cathode}\}$ must be met.

Second, the minimum inner diameter $D_{pilot,\ min}$ of the pilot member must be such that, when the flow rate of the cathode gas (plasma working gas) A is in a predetermined range, the flow entering the insertion portion of the pilot member is prevented from being flow chocking at the entrance opening.

In addition, the length $L_{pilot}$ of the pilot member 2 must satisfy the double inequality $\{L_{pilot,\ max} \ge L_{pilot} \ge L_{pilot,\ min}\}$. Here, $L_{pilot,\ min}$ represents a length of a tube sufficiently long enough to form an adequately developed flow at an igniting a plasma. Here, an adequately developed flow, as described here, indicates a flow that can stabilize an arc jet flowing out from an insertion portion of a pilot member. Usually, the following inequality is satisfied: $\{L_{pilot,\ min}/D_{pilot} \ge 1\}$ Here, the value $L_{pilot,\ max}$ is a maximum value of a length of a tube of a pilot member determined by the following conditions. In other words, the period of time during which the gas, in the amount of the sample, is remaining inside the tube of the pilot member must be short enough so that a thermal disturbance does not extend from the center (electric arc) of the tube to the wall of the tube. In other words, the gas at a portion of the wall must be cool enough so that an electric breakdown of the arc wall can be prevented.

Furthermore, according to the plasma torch 100 based on the present invention, it is preferable that a width $h=\{(D_{pilot}-D_{cathode})/2\}$ between the negative electrode 12 provided in the cathode 1 and the pilot member 2 satisfy the following equations (2) and (3). It is preferable that the minimum value of the width h of the gap be a value such that the average mass velocity of the plasma working gas, i.e., the cathode gas A at a round gap between the negative electrode 12 and the pilot member 2 be a velocity smaller than a sound velocity of the plasma forming gas at an initial temperature. It is preferable that the maximum value of the width h of the gap be a value such that, at a predetermined mass flow rate $G_w$ of the cathode gas A, the Reynolds number $Re=\{4G_w/\pi D_{pilot}\mu_w\}$ corresponding to a condition of the cathode gas A of the pilot member 2 be smaller than a critical Reynolds number $Re_{crit}$=2100 corresponding to a condition in which the flow of the gas inside the tube becomes turbulent.

$$2G_w/[\rho_w(D_{pilot}-D_{cathode})u_{w,\,sound}]<h \quad (2)$$

$$h<2G_w/\pi\mu_w Re_{crit}-D_{cathode}/2 \quad (3)$$

As described above, the plasma torch 100 according to the present invention is configured so that the interior of the cascade 3 is shaped such that the inner diameter of the interior expands in series from the cathode 1 side to the anode 4 side, as described above. Furthermore, the cascade 3 illustrated in FIGS. 1 and 3 comprises five pieces of components 3A to 3E. The components are connected in a condition by the O-ring 34 and the insulated ceramic ring 35 so that each gap between the components is electrically insulated. A conventionally known high-temperature sealed plastic, for example, may be used as such an O-ring 34. In addition, a generally used electric insulating ring such as ceramic may be used as an insulating ceramic ring 35. Furthermore, the cascade 3 is configured so as to be electrically insulated between the cathode 1 and the anode 4 by the O-ring 34 and the ceramic ring 35.

According to the plasma torch 100 based on the above configuration, the number of components (3A to 3E) included in the cascade (inter-electrode insert) 3, i.e., the number of steps through which an expansion is made is determined by the predetermined operating voltage and the arc length. The cascade 3 according to the present embodiment shown in FIG. 3 comprises five components 3A to 3E as described above. As a result, the operating voltage of the plasma torch 100 becomes approximately in the range of 100 to 260 V. This operating voltage is determined, for example, by an inner structure of an electric arc route, the type of plasma forming gas, and a mass flow rate of the plasma forming gas. When a higher operating voltage is applied, there may be a greater number of cascade components that will be necessary.

Further, according to the plasma torch 100 based on the present invention, it is more preferable that the length $L_i$ (mm) of each step, by which the diameter of the cascade 3 expands in series from the pilot member 2 side to the anode 4 side in a direction in which the plasma jet D is ejected, satisfy the following inequality: $\{5 \le L_i\ (\text{mm}) \le 15\}$ When the above length $L_i$ (mm) of each step is less than 5 mm, the water cooling efficiency of the water cooling structure 33 declines. In the worst case, the plasma torch may not operate properly any longer. In addition, when the above length $L_i$ (mm) exceeds 15 mm, the floating potential of the i-th component becomes too high. As a result, a short circuit arc is caused between an inner wall of the part and plasma. It is preferable that length $L_i$ is 5 mm or more and 15 mm or less, so that such the short circuit arc is prevented being generated, and the plasma torch should not break down.

Further, according to the plasma torch 100 based on the present invention, when the length of the cascade 3, the diameter of which expands in series towards the anode 4 side, at an i-th position from the pilot member 2 side towards the direction in which the plasma jet D is ejected is set to $L_i$ (mm), the dimension of the step in the radial direction is set to $\Delta r_i$ (mm), it is preferable that the plasma torch 100 is configured so that the length $L_i$(mm) of each step and the dimension $\Delta r_i$ (mm) of the step satisfy the following inequality: $\{4.5 \le L_i/\Delta r_i \le 15\}$ When the ratio $L_i/\Delta r_i$ is less than 4.5, a reattachment of the plasma flow does not occur in each step. As a result, the layer at the boundary of the wall surface becomes unstable. As a result, the plasma flow becomes a turbulent state. Further, when the ratio $L_i/\Delta r_i$ exceeds 15, a short circuit arc is caused between an inner wall of the part and plasma. As a result, the plasma torch will not function properly.

Furthermore, when the cascade 3 is configured so that the interior is shaped such that the diameter of the interior expands in series towards the anode 4 side, it is preferable that the number of steps of the expansion of the diameter be in the range of four to ten steps. In the example shown in FIGS. 1 and 3, the number of steps provided on the cascade 3 is five. When the number of steps on the cascade between the cathode and the anode is less than 4, it becomes difficult to generate a quasi-laminar flow plasma jet. Further, the diameter of the plasma jet that is generated may become too small.

Furthermore, according to the plasma torch 100 based on the present invention, it is preferable that the length L between the electrodes between the tip 12*a* of the negative electrode 12 provided on the cathode 1 and the end part 4*a* at the cascade 3 side of the anode 4 satisfy the following inequality: $\{50 \le L\ (\text{mm}) \le 150\}$ In the above inequality, the lower limit (50 mm) of the length L between the electrodes corresponds to the minimum arc electric voltage. Here, the arc electric voltage described here based on the present invention refers to the electric power of the plasma torch. For example, when the length L between the electrodes is 50 mm, and nitrogen is used as the cathode gas A, the electric power of the plasma torch becomes approximately 30 to 40 kW.

Further, the upper limit (150 mm) of the length L between the electrodes corresponds to the maximum arc electric voltage. For example, when the length L between the electrodes is 150 mm, and nitrogen is used as a cathode gas A, the electric power of the plasma torch becomes approximately 100 to 120 kW.

In addition, it is more preferable that the plasma torch 100 is configured so that the anode 4 comprises a flow path 4A comprising a plasma inflow path 41, a cylindrical flow path 42, and a smooth inner wall. Here, it is preferable that the plasma inflow path 41 be connected to the outlet 3*b* side of the cascade 3, and include a tapered part 41*a* which is tapered from the end part (inlet) 4*a* side towards the outlet 4*b* side. Here, it is preferable that the circular flow path 42 is connected to the plasma inflow path 41, and stabilizes the plasma by having the same diameter towards the outlet 4*b* side. Further, it is preferable that the plasma torch 100 be configured so that the inner diameter $D_{anode}$ of the circular flow path 42 of the anode 4 and the diameter $D_{pilot}$ of the central opening part 22 of the pilot member 2 satisfy the following inequality: $\{1.5 \le D_{anode}/D_{pilot} \le 2.8\}$ As described above, since the flow path 4A is configured to comprise a smooth inner wall, and a circular flow path 42 is provided at the lower stream of the plasma inflow path 41 to which the electric arc attaches, it is possible to stabilize the plasma flow in an effective manner.

Here, when the ratio $D_{anode}/D_{pilot}$ is less than 1.5, the plasma flow inside the frame of the electric arc flow path expands slightly. Further, when the ratio $D_{anode}/D_{pilot}$ is greater than 2.8, the plasma flow becomes unstable at the outlet portion of the anode 4.

In addition, according to the plasma torch 100 based on the present invention, it is preferable that the total gas mass flow rate $G_{total}$ satisfy the following equations (4) and (5).

$$100 \leqq Re_{total} \leqq 500 \quad (4)$$

$$0.15G_{total} \leqq G_{anode} \leqq 0.3G_{total} \quad (5)$$

$$G_{total} = \sum_j G_j \quad (6)$$

In this case, according to the equations (4) and (5), $Re_{total}$ (=$4G_{total}/\pi D_{anode}\mu$) represents a Reynolds number computed at an intersection at an outlet side of the anode. Further, $G_{total}$ represented by the above generalized equation (6) indicates a total gas mass flow rate (gram/second) forming the plasma.

In particular, the anode shielding gas $G_j$ is supplied to a space between a final step portion of the cascade 3 and the end part 4*a* of the anode 4. Here, $\bar{\mu}=\mu(\bar{T})$ represents a dynamic viscosity of the plasma working gas which is flowing out. This dynamic viscosity is calculated with respect to the average mass temperature of the plasma flow considering the heat and the total mass balance of the plasma flow.

When $Re_{total}$ becomes less than the minimum value (100) in the equation (4), the drop in $Re_{total}$ is due to the buoyancy of the plasma flow. In other words, when $Re_{total}$ becomes less than this minimum value, the plasma flow becomes consequently asymmetrical. Further, when $Re_{total}$ becomes larger than the maximum value (500) in the equation (4), the plasma jet flowing out becomes a turbulent flow.

When the degenerated arc attaches the surface of the anode at a non-uniform possibility, $G_{anode}$ becomes less than $0.15G_{total}$. In addition, when the plasma flow becomes a turbulent flow, $G_{anode}$ becomes larger than $G_{total}$. Therefore, in these cases, the above inequality (5) cannot be satisfied.

Further, as a result of diligent experimentation conducted by the inventors of the present invention, it has become clear that the plasma jet D, being a quasi-laminar flow, can be formed effectively when the gas mixture included in the plasma, i.e., the cathode gas A and the anode gas B included in the plasma forming gas C are such that the maximum value of the mass ratio of each of the gases argon, nitrogen, and hydrogen satisfies each of the equations $\{G_{Argon}/G_{Nitrogen}=0.4\}$ and $\{G_{Hydrogen}/G_{Nitrogen}=0.04\}$.

Figure 5A:
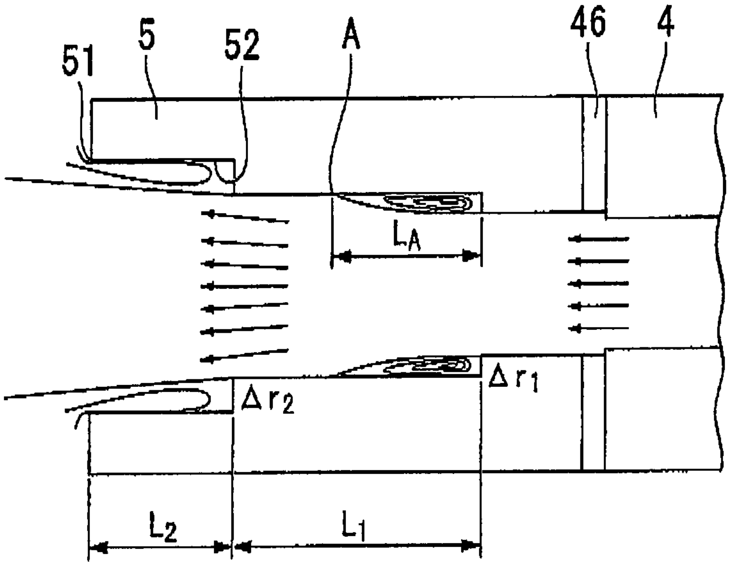
FIG. 5A is a cross sectional diagram illustrating a structure of a plasma torch according to an embodiment of the present invention.
Figure 5B:
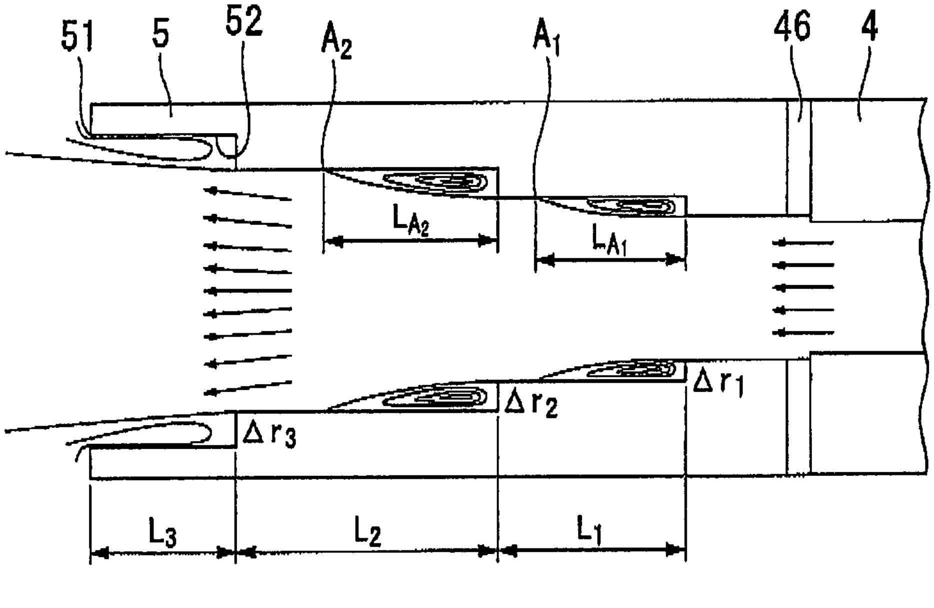
FIG. 5B is a cross sectional diagram illustrating a structure of a plasma torch according to an embodiment of the present invention.
Figure 5C:
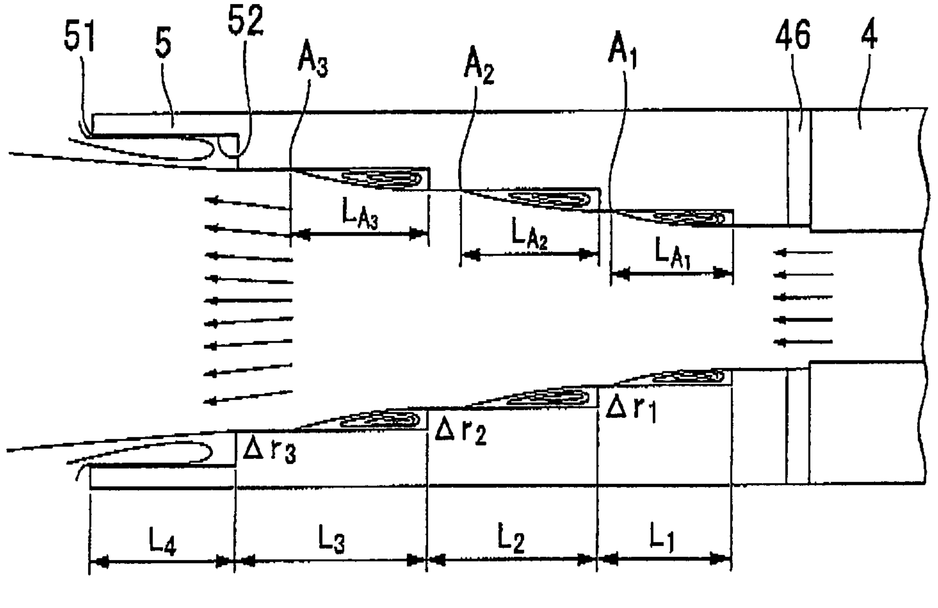
FIG. 5C is a cross sectional diagram illustrating a structure of a plasma torch according to an embodiment of the present invention.

Further, as shown in FIGS. 5A to 5C, the forming nozzle 5 comprising a water cooling structure (not diagrammed) may be structured so that the interior of the forming nozzle 5 is shaped such that the diameter of the interior increases in series from the anode 4 side towards the forming outlet 51. Further, the forming nozzle 5 may be configured to be connected to the anode 4 so that the forming nozzle 5 is electrically insulated from the anode 4. FIGS. 5A to 5C represent an example of a forming nozzle such that the diameter of the cross section of the plasma jet D is increased. FIGS. 5A to 5C illustrates a plurality of backward-facing steps 52 of the forming nozzle 5. For example, according to the example shown in FIG. 5A, a total of two steps are shown. According to the example shown in FIG. 5B, a total of three steps are shown. Further, according to the example shown in FIG. 5C, a total of four steps are shown. In addition, according to FIGS. 5A to 5C, $\Delta r_i$ and $L_i$ each indicates the height dimension and the length dimension of the i-th step 52. $A_i$ indicates the point in the i-th step 52 at which the plasma flow reattaches to the wall of the forming nozzle 5.

Further, according to the present invention, it is more preferable that the inner diameter $D_{exit}$ of the forming outlet 51 of the forming nozzle 5 and the inner diameter $D_{anode}$ of the circular flow pat 42 of the anode 4 satisfy the following equation: $\{1.5 \leq D_{exit}/D_{anode} \leq 2.5\}$ The minimum value and the maximum value of the ratio $D_{exit}/D_{anode}$ in the above equation define the range of the diameter of the cross section of the expandable plasma jet which allows the plasma to flow out based on a stabilized quasi laminar flow.

Further, according to the present invention, the diameter of the forming nozzle 5 increases in series towards the forming outlet 51. When the length of the i-th position in from the anode 4 side of the forming nozzle 5 in the direction in which the plasma jet D is ejected is represented as $L_{Ni}$ (mm), and when the dimension of the step in the radial direction is represented as $\Delta r_{Ni}$, it is preferable that the length $L_{Ni}$ (mm) and the dimension of the step $\Delta r_{Ni}$, satisfy the following inequality: $\{5 \leq L_{Ni}/\Delta r_{Ni} \leq 10\}$ (here, $1 \leq i \leq M-1$; M=number of steps)

When the ratio $L_{Ni}/\Delta r_{Ni}$ is less than five, the reattachment of the plasma flow does not occur, and the layer at the boundary portion of the wall becomes unstable. As a result, the plasma flow becomes a turbulent flow. Further, when the ratio $L_{Ni}/\Delta r_{Ni}$ becomes greater than ten, the length of the forming nozzle greatly increases. As a result, there will be a greater heat loss with respect to the wall of the forming nozzle. Consequently, the thermic effect of the plasma jet decreases.

Further, according to the present invention, it is preferable that the ratio further satisfy the following inequality: $\{2.5 \leq L_{Nm}/\Delta r_{Nm} \leq 4.5\}$ (here, i=M) Here, when the ratio $L_{Nm}/\Delta r_{Nm}$ is less than 2.5, an unstable swirl is created at the final step of the forming nozzle. As a result, the plasma jet that flows out becomes unstable. When the ratio $L_{Nm}/\Delta r_{Nm}$ becomes greater than 4.5, a reattachment section may appear at the last step of the forming nozzle. As a result, the amount of atmospheric gas sucked into the outlet of the forming nozzle from the surrounding environment increases.

Figure 6A:
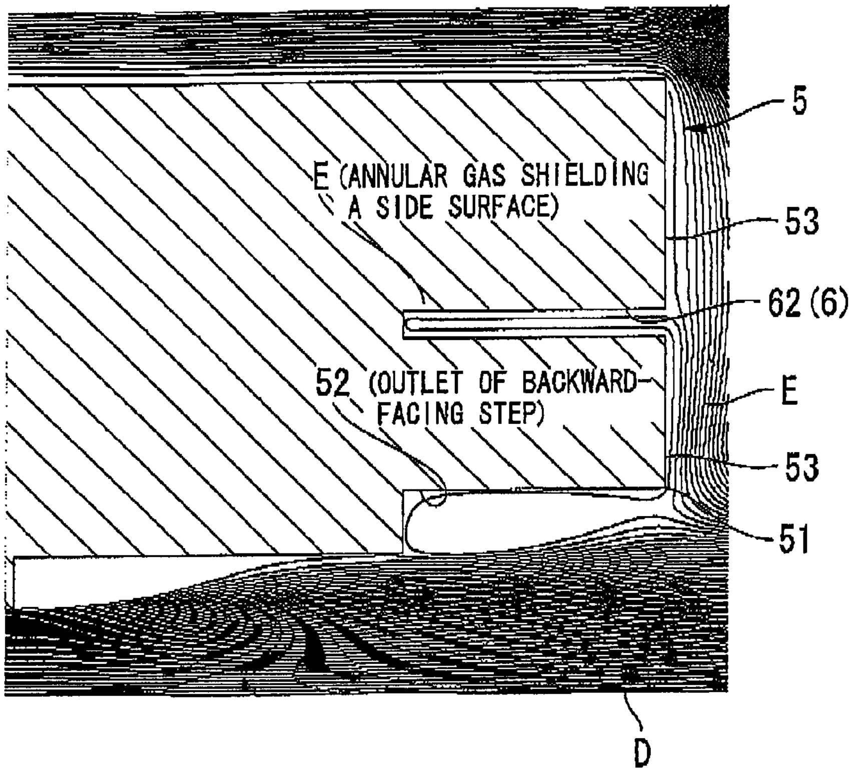
FIG. 6A is a diagram illustrating a plasma torch according to an embodiment of the present invention.
Figure 6B:
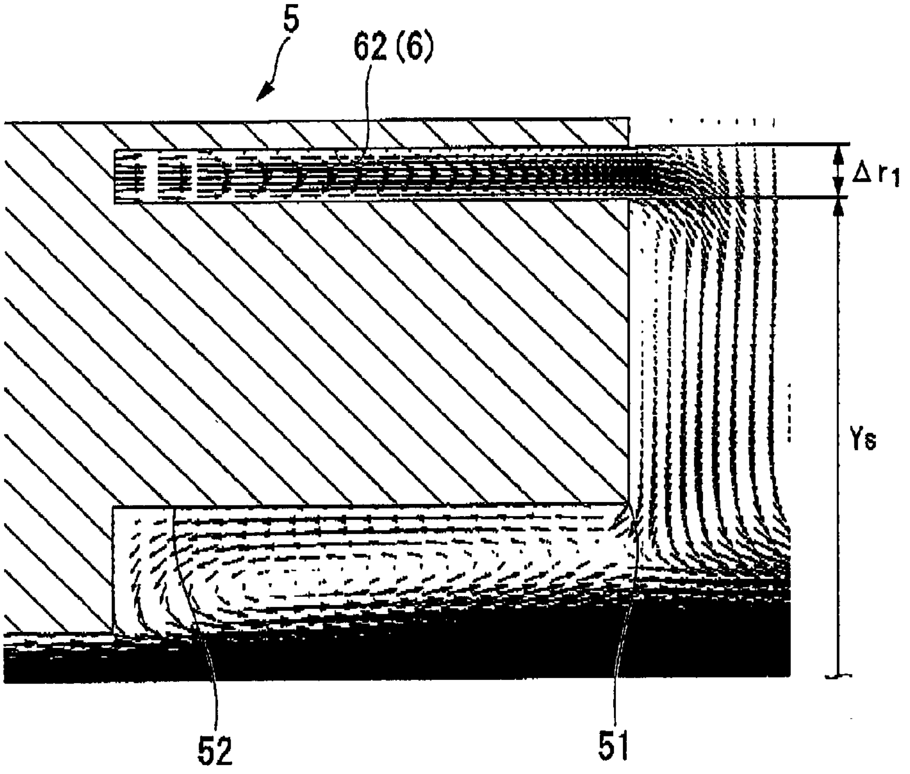
FIG. 6B is diagram illustrating a plasma torch according to an embodiment of the present invention.

Further, as described above, according to the plasma torch 100 based on the present invention, a side shield module 6 is provided (see FIGS. 6A, 6B). The side shield module 6 generates a coaxial, annular, and low-speed gas shield jet, thereby preventing gas from flowing in from the surrounding environment. In this way, the side shield module 6 also prevents oxygen from entering the initial zone of the plasma jet flowing out from the forming nozzle 5. Further, according to the present invention, from the standpoint of effectively preventing oxygen from entering the plasma jet D, it is more preferable that the side shield module 6 uses the gas, at least one of an argon gas and a nitrogen gas, or a gas mixture thereof ejected from plurality holes which are formed to the annular in surroundings of the plasma jet and are arranged in coaxial and axisymmetric, as the gas shield jet.

When a side shield module having the above configuration and operation is not provided, a significant amount of outer air (oxygen) is sucked into the plasma jet. On the other hand, when the side shield module 6 according to the configuration described above in the present embodiment is provided, a portion of the gas (the side shield jet E) is first injected into the last stepped nozzle (step 52) which spreads a diameter (the backward-facing) Next, the portion of the gas (the side shield jet E) begins to be spread in the direction of the normal line so as to blend with a primary plasma forming gas C. Thereafter, an inflow of the outer air (oxygen) is prevented, as a portion of the side shield jet E flows out towards the surrounding space.

As is evident from the flow pattern indicated in FIGS. 6A and 6B, at approximately a medium outlet velocity, the gas shield jet E, which has flown into the annular gas slit (the coaxial slit) 62, bends in the direction of the normal line, and is thereafter spread over the surface of the forming end surface 53 of the forming nozzle 5 as a flow of a radial wall in the direction of the normal line. Thereafter, a portion of the gas shield jet E (shield gas) is sucked into the last step 52 which spreads the diameter. Meanwhile, the other portion of the gas shield jet E is sucked in and blends with the plasma jet D which flows out from the forming outlet 51 of the forming nozzle 5. In this condition, the outer air cannot enter the last step (step 52) which spreads the diameter any further. As a result, it is possible to prevent the outside air from blending with the plasma jet D at the beginning portion of the jet flow near the forming nozzle 5. As a result, the amount of air (oxygen) blending with the plasma jet E flowing out from the forming nozzle 5 is significantly reduced.

Here, the inner radius $r_s$ (mm) of the forming outlet of the gas shield jet E (shield gas) of the annular gas slit 62, the width $\Delta r_s$ (mm) of the slit, the gas mass flow rate $G_s$ (g/sec) of the shield gas, and the mean mass velocity $v_s$ (m/sec) of the gas shield jet E are determined by the suction power of the last step (step 52) of the backward-facing step, and an initial zone of the plasma jet D which is not subject to any external force. Furthermore, regarding an inner radius $r_s$ of the forming outlet, the width $\Delta r_s$ of the slit, and the value of the gas mass flow rate $G_s$, which are specific parameters, the range of the gas shield is defined by the average of the mass velocity represented by the following equation:

$$\{\bar{v}_s=G_s/\pi\rho_s\Delta r_s(r_s+0.5\Delta r_s)\}$$

Furthermore, according to the present embodiment, a configuration is possible in which the outer diameter of a portion of the cathode 1, the pilot member 2, the cascade 3, the anode 4, and the forming nozzle 5 of the plasma torch 100 having the widest diameter is less than or equal to 70 mm. Furthermore, a configuration is possible in which the maximum length combining each of these components is less than or equal to 300 mm. By setting the dimension of the plasma torch 100 in the above range, it is possible to set each of the parameters concerning the number of steps, the height dimension of the step, and the length of the step regarding the interior shape of the cascade in an appropriate range.

As described above, according to the plasma torch 100 based on the present invention, a cascade 3 is provided between a cathode 1 and an anode 4. The cascade 3 is an inter-electrode insert. In addition, the cascade 3 is structured so that the diameter of the interior of the cascade 3 increases in series from the cathode 1 side of the cascade 3 to the anode 4 side of the cascade 3. According to the present invention, the cascade 3 is provided having the above-described structure. As a result, the output power of the plasma torch 100 can be obtained by an increase in the arc electric voltage without relying on an increase in the electric current. Therefore, it is possible to increase the lifespan of each of the electrodes, i.e., the cathode 1 and the anode 4. In addition, since the interior of the cascade 3 is shaped so that the diameter of the cascade 3 increases in series, a quasi-laminar flow of the plasma is created in the interior of the cascade 3. Hence, the fluctuation of the output power of the plasma jet D can be reduced. Moreover, the cost of operation and processing can be lowered. Consequently, it is possible to obtain a plasma torch 100 which can perform surface treatment utilizing a high-performance plasma with a high degree of efficiency. In addition, a side shield module 6 is provided at an outlet side of the anode 4 of the forming nozzle 5. The side shield module 6 generates a gas shield jet which is coaxial, annular, and low-velocity. Thus, gas from the surrounding environment is prevented from flowing in. Consequently, oxygen is prevented from entering the forming nozzle 5 and the plasma jet D. Hence, it is possible to generate a plasma jet D having a low Reynolds number of the plasma forming gas, with a quasi laminar flow, exhibiting low noise, the diameter of its cross section expanding in a stable manner, having a long plasma length, and comprising argon, nitrogen, and hydrogen.

Working Example

Hereinafter, a working example of a plasma torch according to the present invention is described, and the present invention is described in further detail. The present invention is not to be limited by the following working examples. It is possible to practice the present invention by applying modifications in an appropriate manner so as to be in line with the gist of the present invention described above and in the following. What is obtained by applying such modifications is also included in the technical scope of the present invention.

According to the present invention, following table 1 shows a embodiment related to the generation of the quasi-laminar flow plasma jet by this invention. In this case, the plasma working gas includes argon, nitrogen, and hydrogen as an anode gas and a cathode gas. The maximum value $G_{argon}$, $G_{Nitrogen}$, and $G_{Hydrogen}$ of these each mass ratio used the gas that was the relation shown in following table 1. Other conditions when the anode gas is supplied are shown in following table 1.

In addition, a Reynolds number $\{Re=\{4Gw/\pi D_{pilot}\mu_w\}$ of a cathode gas when the gas passes through the pilot member from the cathode side and flows into the cascade side was obtained based on the specification of the plasma torch shown in FIG. 2, and the flow state (a quasi laminar flow, a turbulent flow) of plasma jet inside the tube was determined. At this time, the determination was made according to a critical Reynolds number $\{Re_{crit}=2100\}$ at which the gas flow inside the tube becomes a turbulent state. In addition, the supply conditions of the cathode gas are shown in following table 1, and the determination results regarding the Reynolds number and the flow states are shown in following table 2.

In addition, the diameter of the cross section of the plasma jet formed by the forming nozzle and the plasma length up to the tip of the plasma jet were measured using a 3CCD video camera when plasma irradiation was performed under the respective conditions, and the result is shown in following table 4.

Moreover, the noise level (dB) caused by the plasma jet was measured by a commercially available noise level meter (manufactured by Rion Co., Ltd., model No. NA-28) when plasma irradiation was performed under the respective conditions, and the result is shown in following table 4. At this time, the measurement was performed while a sensor portion (microphone) of the noise level meter is placed at a position separated from the exit of the plasma torch in the axial direction by 1 m and in the axis direction by 1 m.

Following table 1 shows a list of compositions of the plasma forming gas and supply conditions of the cathode gas, and following table 2 shows a list of determination results for the Reynolds number and the flow state of the cathode gas, and the evaluation results for the diameter of cross section, the plasma length, the noise level, the electrode life time, and the life time of the plasma jet.

[Table 1]

[Table 2]

As shown in tables 1 and 2, it was confirmed that the plasma forming gas was a quasi laminar flow and the output variation was small in all the embodiments using the plasma torch of the present invention, which includes the forming nozzle and the cascade having an interior shaped so as to expand in multiple steps and the side shield module. In addition, according to the embodiments of the present invention, the diameter of the cross section of the plasma jet was as large as 18 mm or greater, and a long plasma jet with the plasma length of longer than or equal to 150 mm was obtained. Moreover, according to the embodiments of the present invention, it was confirmed that the noise level was suppressed to lower than or equal to 95 dB and the electrode life time was as long as 50 hours or longer.

Thus, it became apparent that the usage of the plasma torch of the present invention made it possible to perform surface treatment, such as plasma spraying utilizing high-performance plasma processing, a processing of refractory powder materials, and plasma chemistry processing and the like, with a high degree of efficiency.

On the other hand, according to the comparative examples using a plasma torch with a conventional configuration, it was confirmed that the flow of the plasma forming gas became turbulent, the diameter of the cross section of the plasma jet was smaller as compared with the aforementioned embodiments of the present invention, and the plasma length was small. Accordingly, the comparative examples exhibited inferior characteristics regarding at least one of noise level and electrode life time.

In the comparative example 1, the flow of the plasma forming gas became turbulent while the Reynolds number (Re) thereof was approximately 528, and the plasma length was as small as 70, since a plasma torch with a cascade which does not have an interior shaped so as to expand in multiple steps was used. Accordingly, the flow of the plasma became turbulent and atmospheric oxygen was greatly entrained.

In the comparative example 2, the Reynolds number (Re) was approximately 210, and the plasma was in an unstable state, since neither of the cascade and the forming nozzle had interiors shaped so as to expand in multiple steps.

In the comparative example 3, a plasma torch was used in which the cascade and the forming nozzle did not have interiors shaped so as to expand in multiple steps and the side shield module was not provided. Therefore, the flow of the plasma forming gas became turbulent while the Reynolds number (Re) thereof was approximately 513, and the plasma length was as small as 120 mm in the comparative example 3. Moreover, it was visually confirmed that external air flew into the forming nozzle and the initial zone of the plasma jet and the plasma jet was in an unstable state due to entrained oxygen since the side shield module was not provided in the plasma torch in the comparative example 3.

In the comparative example 4, the Reynolds number (Re) of the plasma forming gas was approximately 457, and the plasma was in an unstable state, since the cascade and the forming nozzle did not have interiors shaped so as to expand in multiple steps and the anode gas was insufficient in the same manner as above.

In the comparative example 5 as well, the flow of the plasma forming gas became turbulent while the Reynolds number (Re) was approximately 537, and the plasma was in an unstable state, since the cascade and the forming nozzle did not have interiors shaped so as to expand in multiple steps and excessive nitrogen existed in the cathode gas.

In the comparative example 6 as well, the flow of the plasma forming gas became turbulent while the Reynolds number (Re) was approximately 791, and the plasma was in an unstable state, since the cascade and the forming nozzle did not have interiors shaped so as to expand in multiple steps and excessive argon and nitrogen existed in the cathode gas.

In the comparative example 7 as well, as above, the Reynolds number (Re) of the plasma forming gas was approximately 432, the plasma was in an unstable state, and the electrode was damaged due to the excessive hydrogen in the cathode gas, which resulted in the life time thereof being extremely short, since the cascade and the forming nozzle did not have interiors shaped so as to expand in multiple steps.

In the comparative example 8 as well, the Reynolds number (Re) of the plasma forming gas was approximately 324, the plasma was in an unstable state, and the electrode was damaged due to the excessive hydrogen in the anode gas, which resulted in the life time thereof being extremely short, since the cascade and the forming nozzle did not have interiors shaped so as to expand in multiple steps.

In the comparative example 9 as well, the flow of the plasma forming gas became turbulent while the Reynolds number (Re) was approximately 607, the plasma was in an unstable state, and the electrode was damaged due to the excessive hydrogen in the anode gas, which resulted in the life time thereof being extremely short, since the cascade and the forming nozzle did not have interiors shaped so as to expand in multiple steps.

INDUSTRIAL APPLICATION

The plasma torch according to the present invention comprises a cathode, being an inter-electrode insert between the cathode and the anode. Thus, it is possible to obtain a plasma torch which can perform surface treatment such as plasma spraying, utilizing a high-performance plasma processing, a processing of refractory powder materials, and plasma chemistry processing and the like, with a high degree of efficiency. Hence, the industrial effect of the present invention is significant.

TABLE 1

| | | COMPOSITIONS OF PLASMA WORKING GAS | | | | | | | | SUPPLY CONDITIONS OF THE CATHODE GAS | | |
|---|---|---|---|---|---|---|---|---|---|---|---|---|
| | | CATHODE GAS | | | | | ANODE GAS | | | MASS FLOW | | |
| Type | SAMPLE NO | $G_{Argon}$ | $G_{Nitrogen}$ | $G_{Hydrogen}$ | $G_{Argon}/G_{Nitrogen}$ | $G_{Hydrogen}/G_{Nitrogen}$ | $G_{Argon}$ | $G_{Nitrogen}$ | $G_{Hydrogen}$ | Gw | $D_{pilot}$ (mm) | $\mu_w$ (kg/m · s) |
| EXAMPLES OF PRESENT INVENTION | 1 | 0.000 | 0.271 | 0.000 | 0.000 | 0.000 | 0.089 | 0.000 | 0.000 | 0.271 | 5 | 1.94E−04 |
| | 2 | 0.059 | 0.438 | 0.000 | 0.136 | 0.000 | 0.059 | 0.000 | 0.000 | 0.497 | 5 | 1.97E−04 |
| | 3 | 0.059 | 0.438 | 0.000 | 0.136 | 0.000 | 0.149 | 0.000 | 0.000 | 0.497 | 5 | 1.97E−04 |
| | 4 | 0.059 | 0.354 | 0.003 | 0.168 | 0.008 | 0.104 | 0.000 | 0.000 | 0.417 | 5 | 1.96E−04 |
| | 5 | 0.000 | 0.438 | 0.007 | 0.000 | 0.017 | 0.119 | 0.000 | 0.000 | 0.445 | 5 | 1.92E−04 |
| | 6 | 0.030 | 0.396 | 0.004 | 0.075 | 0.011 | 0.089 | 0.000 | 0.000 | 0.430 | 5 | 1.94E−04 |
| | 7 | 0.000 | 0.438 | 0.007 | 0.000 | 0.017 | 0.119 | 0.000 | 0.000 | 0.445 | 6 | 1.92E−04 |
| COM-PARATIVE EXAMPLES | 1 | 0.654 | 0.000 | 0.000 | NA | NA | 0.149 | 0.000 | 0.000 | 0.654 | 5 | 2.15E−04 |
| | 2 | 0.030 | 0.208 | 0.000 | 0.143 | 0.000 | 0.059 | 0.000 | 0.000 | 0.238 | 5 | 1.97E−04 |
| | 3 | 0.357 | 0.250 | 0.000 | 1.426 | 0.000 | 0.149 | 0.000 | 0.000 | 0.607 | 5 | 2.06E−04 |
| | 4 | 0.059 | 0.354 | 0.003 | 0.168 | 0.008 | 0.238 | 0.000 | 0.000 | 0.417 | 5 | 1.96E−04 |
| | 5 | 0.178 | 0.438 | 0.003 | 0.407 | 0.007 | 0.149 | 0.000 | 0.000 | 0.619 | 5 | 1.99E−04 |

TABLE 1-continued

| | | COMPOSITIONS OF PLASMA WORKING GAS | | | | | | | | SUPPLY CONDITIONS OF THE CATHODE GAS | | |
|---|---|---|---|---|---|---|---|---|---|---|---|---|
| | | CATHODE GAS | | | | | ANODE GAS | | | MASS FLOW | | |
| Type | SAMPLE NO | $G_{Argon}$ | $G_{Nitrogen}$ | $G_{Hydrogen}$ | $G_{Argon}/G_{Nitrogen}$ | $G_{Hydrogen}/G_{Nitrogen}$ | $G_{Argon}$ | $G_{Nitrogen}$ | $G_{Hydrogen}$ | Gw | $D_{pilot}$ (mm) | $\mu_w$ (kg/m · s) |
| | 6 | 0.297 | 1.042 | 0.003 | 0.285 | 0.003 | 0.149 | 0.000 | 0.000 | 1.342 | 4 | 1.98E−04 |
| | 7 | 0.000 | 0.417 | 0.015 | 0.000 | 0.036 | 0.163 | 0.000 | 0.000 | 0.432 | 5 | 1.89E−04 |
| | 8 | 0.059 | 0.354 | 0.003 | 0.168 | 0.008 | 0.030 | 0.000 | 0.003 | 0.417 | 5 | 1.96E−04 |
| | 9 | 0.059 | 0.438 | 0.000 | 0.136 | 0.000 | 0.149 | 0.208 | 0.000 | 0.497 | 5 | 1.97E−04 |

| | | OTHER CONDITIONS AND EVALUATION ITEMS | | | | | |
|---|---|---|---|---|---|---|---|
| Type | SAMPLE NO | Re | $G_{anode}/G_{total}$ | $D_{anode}$ (mm) | $\mu_w$ (kg/m · s) | $Re_{total}$ | REMARKS |
| EXAMPLES OF PRESENT INVENTION | 1 | 356 | 0.33 | 9 | 1.99E−04 | 255.71 | |
| | 2 | 644 | 0.12 | 9 | 1.99E−04 | 396.65 | |
| | 3 | 644 | 0.30 | 9 | 2.01E−04 | 454.92 | |
| | 4 | 541 | 0.25 | 9 | 2.00E−04 | 369.27 | |
| | 5 | 591 | 0.27 | 9 | 1.96E−04 | 407.41 | |
| | 6 | 565 | 0.21 | 9 | 1.97E−04 | 372.69 | |
| | 7 | 493 | 0.27 | 12 | 1.96E−04 | 305.56 | |
| COMPARATIVE EXAMPLES | 1 | 774 | 0.23 | 9 | 2.15E−04 | 527.65 | EXCESSIVE $Re_{total}$ CAUSED BY PLETHORA OF Ar |
| | 2 | 306 | 0.25 | 9 | 2.00E−04 | 210.15 | INSUFFICENT $Re_{total}$ CAUSED BY INSUFFICIENT $N_2$ |
| | 3 | 748 | 0.24 | 9 | 2.08E−04 | 513.40 | EXCESSIVE $Re_{total}$ CAUSED BY PLETHORA OF $ArN_2$ |
| | 4 | 541 | 0.57 | 9 | 2.03E−04 | 456.79 | INSUFFICIENT ANODE GAS |
| | 5 | 790 | 0.24 | 9 | 2.02E−04 | 536.95 | EXCESSIVE $Re_{total}$ CAUSED BY PLETHORA OF $N_2$ |
| | 6 | 2154 | 0.11 | 12 | 2.00E−04 | 791.25 | EXCESSIVE Re CAUSED BY PLETHORA OF $ArN_2$ |
| | 7 | 581 | 0.38 | 9 | 1.95E−04 | 432.08 | DAMAGED ELECTRODE CAUSED BY PLETHORA OF $H_2$ IN CATHODE |
| | 8 | 541 | 0.08 | 9 | 1.96E−04 | 324.41 | DAMAGED ELECTRODE CAUSED BY PLETHORA OF $H_2$ IN ANODE |
| | 9 | 644 | 0.72 | 9 | 1.99E−04 | 606.79 | DAMAGED ELECTRODE CAUSED BY PLETHORA OF $H_2$ IN ANODE |

TABLE 2

| | | PLASMA WORKING GAS AND CONDITION OF PLASMA JET | | | | | | |
|---|---|---|---|---|---|---|---|---|
| | | CONDITION OF CATHODE GAS | | | | | | |
| TYPE | SAMPLE NO. | Reynolds number (Re) | DETERMINATION | DIAMETER OF CROSS SECTION (mm) | PLASMA LENGTH (mm) | NOISE LEVEL (dB) | LIFE TIME (hr) | EVALUATION RESULTS |
| EXAMPLES OF PRESENT INVENTION | 1 | 255.71 | QUASI-LAMINAR FLOW | 18.00 | 600.00 | 70 | >1000 | GOOD |
| | 2 | 396.65 | QUASI-LAMINAR FLOW | 18.00 | 500.00 | 80 | >1000 | GOOD |
| | 3 | 454.92 | QUASI-LAMINAR FLOW | 18.00 | 400.00 | 80 | >1000 | GOOD |
| | 4 | 369.27 | QUASI-LAMINAR FLOW | 18.00 | 200.00 | 90 | 100 | GOOD |
| | 5 | 407.41 | QUASI-LAMINAR FLOW | 18.00 | 150.00 | 95 | 50 | GOOD |

TABLE 2-continued

| TYPE | SAMPLE NO. | PLASMA WORKING GAS AND CONDITION OF PLASMA JET — CONDITION OF CATHODE GAS — Reynolds number (Re) | DETERMINATION | DIAMETER OF CROSS SECTION (mm) | PLASMA LENGTH (mm) | NOISE LEVEL (dB) | LIFE TIME (hr) | EVALUATION RESULTS |
|---|---|---|---|---|---|---|---|---|
| | 6 | 372.69 | QUASI-LAMINAR FLOW | 18.00 | 200.00 | 90 | 100 | GOOD |
| | 7 | 305.56 | QUASI-LAMINAR FLOW | 25.00 | 150.00 | 95 | 50 | GOOD |
| COMPARATIVE EXAMPLES | 1 | 527.65 | TURBULENT FLOW | 18.00 | 70.00 | 80 | >100 | TURBULENT FLOW CAUSED BY PLETHORA OF Ar |
| | 2 | 210.15 | TURBULENT FLOW | 18.00 | 120.00 | 80 | NA | UNSTABLE PLASMA |
| | 3 | 513.40 | TURBULENT FLOW | 18.00 | 120.00 | 80 | >100 | TURBULENT FLOW CAUSED BY PLETHORA OF Ar |
| | 4 | 456.79 | TURBULENT FLOW | 18.00 | 250.00 | 80 | NA | UNSTABLE PLASMA |
| | 5 | 536.95 | TURBULENT FLOW | 18.00 | 200.00 | 90 | >100 | TURBULENT FLOW CAUSED BY PLETHORA OF Ar |
| | 6 | 791.25 | TURBULENT FLOW | 25.00 | 180.00 | 100 | >100 | TURBULENT FLOW CAUSED BY PLETHORA OF Ar |
| | 7 | 432.08 | TURBULENT FLOW | 18.00 | 120.00 | 115 | <0.1 | DAMAGED ELECTRODE CAUSED BY PLETHORA OF $H_2$ IN CATHODE |
| | 8 | 324.41 | TURBULENT FLOW | 18.00 | 120.00 | 105 | <0.1 | DAMAGED ELECTRODE CAUSED BY PLETHORA OF $H_2$ IN ANODE |
| | 9 | 606.79 | TURBULENT FLOW | 18.00 | 130.00 | 85 | 1 | DAMAGED ELECTRODE CAUSED BY PLETHORA OF $H_2$ IN ANODE |

What is claimed is:

1. A plasma torch of a cascade-type comprising a cathode, an anode, a cascade between the cathode and the anode, and a pilot member between the cathode and the cascade, the plasma torch generating a plasma jet by applying an electric voltage between the cathode and the anode, wherein:

the cathode comprises a copper main body part comprising a channel structure including a water cooling structure, and a rod-shaped tungsten negative electrode inserted in the copper main body part;

the pilot member is electrically insulated from the cathode and the anode, the pilot member comprising a channel structure including a water cooling structure;

the cascade is between the pilot member and the anode;

the cascade comprises either a single component having an interior shaped so as to expand in multiple steps towards a side of the anode, or a plurality of components being electrically insulated from each other, the cascade being electrically insulated from the cathode and the anode, wherein the cascade comprises a channel structure including a water cooling structure;

the anode is a copper component comprising a channel structure including a water cooling structure;

the plasma torch further comprises a forming nozzle being connected so as to be electrically insulated from the anode, an interior of the forming nozzle shaped so as to expand in multiple steps towards an opposite side of the anode, the forming nozzle comprising a channel structure including a water cooling structure; and the plasma torch further comprises a side shield module preventing a gas inflow from a surrounding environment by generating a coaxial, annular, and low-velocity gas shield jet, thereby preventing oxygen from entering the forming nozzle and the plasma jet ejected from the forming nozzle.

2. A plasma torch according to claim 1 wherein a diameter $D_{cathode}$ of a tip of the negative electrode provided on the cathode satisfy an equation (1) $\{D_{cathode}=2+[(I-100)/100]\ (mm)\}$, wherein in the equation (1), [x] is an integer portion of x, an inside of a parenthesis; I is an arc electric current (A) in a range of $100 \leq I \leq 400$ (A).

3. A plasma torch according to claim 1 wherein a diameter $D_{pilot}$ of a central opening part of the pilot member, and a diameter $D_{cathode}$ of a tip of the negative electrode provided on the cathode, satisfy an equation $\{D_{pilot}>D_{cathode}\}$.

4. A plasma torch according to either one of claim 1 or claim 2 wherein a bypass hole is provided at a surrounding of the central opening part provided on the pilot member; and the working gas for generating a plasma flows from a side of the cathode towards a side of the cascade by passing through at least one of the central opening part or the bypass hole.

5. A plasma torch according to claim 1 wherein a width $h=\{(D_{pilot}-D_{cathode})/2\}$ of a gap between the pilot member and the negative electrode provided on the cathode satisfies an equation (2) $\{2G_w/[\rho_w(D_{pilot}-D_{cathode})u_{w,\ sound}]<h\}$ and an equation (3) $\{h<2G_w/\pi\mu_w Re_{crit}-D_{cathode}/2\}$;

a minimum value of the width h of the gap is a value such that a mean mass velocity of the plasma working gas existing in a round gap between the negative electrode and the pilot member is smaller than a sound velocity of a plasma forming gas at an initial temperature; and a maximum value of the width h of the gap is a value such that, at a predetermined mass flow rate Gw of the plasma working gas, a Reynolds number $Re=\{4Gw/\pi D_{pilot}\mu_w\}$ corresponding to a condition of a plasma working gas at an entrance of the pilot member is smaller than a critical Reynolds number $Re_{crit}=2100$, the critical Reynolds number being a value such that a gas flow inside a tube becomes a turbulent condition.

6. A plasma torch according to claim 1 wherein
the cascade comprises a plurality of components;
an O-ring and an insulating ceramic ring are provided between each of the plurality of component and between the cascade and the cathode and the anode; and
a space between each of the plurality of components, and a space between the cascade and the cathode and the anode are connected while being electrically insulated.

7. A plasma torch according to claim 1 wherein
a diameter of the cascade increases in series in one or more steps from a side of the pilot member towards a side of the anode, and a length $L_i$ (mm) of each step in a direction in which a plasma jet is ejected satisfies an equation $\{5 \le L_i \text{(mm)} \le 15\}$.

8. A plasma torch according to claim 1 wherein
a diameter of the cascade increases in series in one or more steps towards a side of the anode, and when a length of an i-th position of the cascade from a side of the pilot member in a direction in which a plasma jet is ejected is represented as a $L_i$ (mm), and a dimension of a step in a radial direction is represented as a $\Delta r_i$ (mm), the $L_i$ (mm) and the $\Delta r_i$ (mm) in each of the steps satisfy an equation $\{4.5 \le L_i/\Delta r_i \le 15\}$.

9. A plasma torch according to either one of claim 7 or claim 8 wherein
an inter-electrode length L between a tip of the negative electrode provided on the cathode and a tip of a side of the cascade of the anode satisfies an equation $\{50 \le L \text{(mm)} \le 150\}$.

10. A plasma torch according to claim 1 wherein
the anode comprises a flow path comprising
a plasma inflow path, which is connected to an outlet side of the cascade and comprises a tapered portion shaped so as to taper from an entrance side to the outlet side;
a cylindrical flow path, which is connected to the plasma inflow path, and stabilizes the plasma by being provided with a same diameter towards the outlet side; and
a smooth inner wall, wherein
an inner diameter $D_{anode}$ of the cylindrical flow path of the anode and a diameter $D_{pilot}$ of a central opening part of the pilot member satisfy an equation $\{1.5 \le D_{anode}/D_{pilot} \le 2.8\}$.

11. A plasma torch according to claim 1 wherein
a total gas mass flow rate $G_{total}$ satisfies an equation (4) $\{100 \le Re_{total} \le 500\}$ and an equation (5) $\{0.15\ G_{total} \le G_{anode} \le 0.3\ G_{total}\}$, wherein a $Re_{total}(=4G_{total}/\pi D_{anode}\mu)$ in the equation (4) and the equation (5) indicates a Reynolds number computed at a cross section of an outlet side of the anode, and a $G_{total}$ in a generalized equation (6)

$$\left\{G_{total} = \sum_j G_j\right\}$$

indicates the total gas mass flow rate (gram/second) of a j-th element of a gas compound comprised in a plasma and an anode shielding gas $G_j$.

12. A plasma torch according to claim 11 wherein
a gas compound comprised in the plasma is such that a maximum value of a mass ratio of each of argon, nitrogen, and hydrogen satisfy a first equation $\{G_{Argon}/G_{Nitrogen}=0.4\}$ and a second equation $\{G_{Hydrogen}/G_{Nitrogen}=0.04\}$.

13. A plasma torch according to claim 12 wherein
the forming nozzle comprising a channel structure including water cooling structure comprises an interior shaped so that a diameter of the interior increases in series from a side of the anode towards an forming outlet, the forming nozzle being connected while being electrically insulated from the anode.

14. A plasma torch according to claim 13 wherein
a ratio between an inner diameter $D_{exit}$ at an forming outlet of the forming nozzle and an inner diameter $D_{anode}$ of the cylindrical flow path of the anode satisfies an equation $\{1.5 \le D_{exit}/D_{anode} \le 2.5\}$.

15. A plasma torch according to claim 14 wherein
a diameter of the forming nozzle increases in series over one or more steps towards the forming outlet, and when a length of an i-th position of the forming nozzle from a side of the anode in a direction in which a plasma jet is ejected is represented as a $L_{Ni}$ (mm), and a dimension of a step in a radial direction is represented as a $\Delta r_i$ (mm), the $L_{Ni}$ (mm) and the $\Delta r_i$ (mm) satisfy an equation $\{5 \le L_{Ni}/\Delta r_i \le 10\}$, wherein an inequality $\{1 \le i \le M-1\}$ is satisfied, the M being a number of steps.

16. A plasma torch according to claim 1 wherein
the side shield module uses the gas of at least one of an argon gas and a nitrogen gas, or a gas mixture thereof ejected from a plurality of holes which are arranged in coaxial and axisymmetric states or slits in a coaxial state, both of which are formed to the annular shape in surroundings of the plasma jet, as the gas shield jet.

17. A plasma torch according to claim 1 wherein
an interior of the cascade is shaped so that a diameter of the interior increases in series by a plurality of steps towards a side of the anode, wherein a number of the steps is in a range of four to ten.

18. A plasma torch according to claim 1 wherein
an outer diameter of a portion of the cathode, the cascade, the anode, and the forming nozzle having a largest diameter is less than or equal to 70 mm, and
a maximum length combining a length of the cathode, a length of the cascade, a length of the anode, and a length of the forming nozzle is less than or equal to 300.

* * * * *